(12) United States Patent
Kiyohara et al.

(10) Patent No.: US 8,195,764 B2
(45) Date of Patent: Jun. 5, 2012

(54) INFORMATION DELIVERY SYSTEM, DELIVERY REQUEST PROGRAM, TRANSFER PROGRAM, DELIVERY PROGRAM, AND THE LIKE

(75) Inventors: Yuji Kiyohara, Nagoya (JP); Yoshihiko Hibino, Nagoya (JP); Hiroaki Suzuki, Nagoya (JP); Kentaro Ushiyama, Nagoya (JP); Hideki Matsuo, Nagoya (JP); Koichi Iijima, Higashikurume (JP); Tomohiro Kudo, Tsukuba (JP); Osamu Tatebe, Ushiku (JP); Yuetsu Kodama, Tsukuba (JP); Kazuyuki Shudo, Kawasaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 605 days.

(21) Appl. No.: 11/822,955

(22) Filed: Jul. 11, 2007

(65) Prior Publication Data

US 2007/0283043 A1 Dec. 6, 2007

Related U.S. Application Data

(63) Continuation-in-part of application No. PCT/JP2005/019225, filed on Oct. 19, 2005.

(30) Foreign Application Priority Data

Jan. 13, 2005 (JP) ................................. 2005-006741
Jan. 14, 2005 (JP) ................................. 2005-008243

(51) Int. Cl.
*G06F 15/16* (2006.01)
(52) U.S. Cl. ........................................ 709/217; 709/203
(58) Field of Classification Search .......... 709/238–244, 709/216–219; 707/1–10
See application file for complete search history.

(56) References Cited

U.S. PATENT DOCUMENTS 6,058,423 A 5/2000 Factor
6,311,219 B1 10/2001 Factor
(Continued)

FOREIGN PATENT DOCUMENTS

JP A 7-319750 12/1995
(Continued)

OTHER PUBLICATIONS

B. Zhao et al., "Tapestry: And Infrastructure for Fault-Tolerant Wide-Area Location and Routing," Report UCB/CSD-01-1141, Apr. 2001.
(Continued)

*Primary Examiner* — Ian N Moore
*Assistant Examiner* — Afshawn Towfighi
(74) *Attorney, Agent, or Firm* — Oliff & Berridge, PLC

(57) ABSTRACT

A first node device transmits to a second node device unique identification information corresponding to specific common information, receives from the information saving node device the relevant information regarding the information saving node device, and requests to a selected information saving node device delivery of the specific common information,
the second node device searches the node information and, in a case where there is node information, transfers the identification information to the information saving node device, which is indicated by node information, and
the information saving node device, in a case where the transmission of the specific common information indicated by the identification information is available, transmits to the first node device the relevant information regarding the information saving node device, and, in a case where delivery request for the specific common information is received from the first node device, delivers specific common information.

38 Claims, 18 Drawing Sheets

U.S. PATENT DOCUMENTS 6,453,350 B1 9/2002 Factor
2002/0184358 A1* 12/2002 Traversat et al. ............. 709/223

FOREIGN PATENT DOCUMENTS

| JP | A-8-249186 | 9/1996 |
| JP | A-10-207851 | 8/1998 |
| JP | A 2002-318720 | 10/2002 |
| JP | A 2004-127189 | 4/2004 |
| JP | A 2004-185263 | 7/2004 |

OTHER PUBLICATIONS

J. Kubiatowicz et al., "OceanStore: An Architecture for Global-Scale Persistent Storage," Proceedings of the ninth International Conference on Architectural Support for Programming Languages and Operating Systems (ASPLOS 2000), Nov. 2000.

I. Stoics et al., "Chord: A Scalable Peer-to-Peer Lookup Service for Internet Applications," ACM SIGCOMM, Aug. 2001.

K. Nakauchi et al., "Distributed Content Location for Ubiquitous Environments," IEICE Technical Report, Sep. 2002.

T. Kato et al., "Jupiter: Peer-to-Peer Networking Platform toward Ubiquitous Communications," IPSJ SIG Technical Report, Nov. 2003.

Zhao, B. Y., et al., "Tapestry: An Infrastructure for Fault-tolerant Wide-area Location and Routing," Report No. UCB/CSD-01-1141, Apr. 2001, Computer Science Division, University of California, Berkeley, CA 94720.

* cited by examiner

| 01300000 | 10230210 | 22031000 | 32201010 |
|---|---|---|---|
| IP ADDRESS 0 | - | IP ADDRESS 2 | IP ADDRESS 3 |

(B)

| 10230210 | 11320101 | 12020230 | 13210001 |
|---|---|---|---|
| - | IP ADDRESS 4 | IP ADDRESS 5 | IP ADDRESS 6 |

(C)

| 10000302 | - | 10230210 | - |
|---|---|---|---|
| IP ADDRESS 7 | | | |

(D)

| | TARGET DIGIT OF EACH LEVEL 0 | TARGET DIGIT OF EACH LEVEL 1 | TARGET DIGIT OF EACH LEVEL 2 | TARGET DIGIT OF EACH LEVEL 3 |
|---|---|---|---|---|
| LEVEL 1 | 01300000 | 10230210 | 22031000 | 32201010 |
| LEVEL 2 | IP ADDRESS 0 | - | IP ADDRESS 2 | IP ADDRESS 3 |
| | 10230210 | 11320101 | 12020230 | 13210001 |
| LEVEL 3 | - | IP ADDRESS 4 | IP ADDRESS 5 | IP ADDRESS 6 |
| | 10000302 | - | 10230210 | - |
| LEVEL 4 | IP ADDRESS 7 | - | - | - |
| LEVEL 5 | - | - | - | - |
| | 10230210 | - | - | - |
| LEVEL 6 | - | - | - | 10230210 |
| LEVEL 7 | - | 10230210 | - | - |
| LEVEL 8 | - | - | - | - |

FIG.9

CANDIDATE LIST SAVED IN STORAGE
PART 12 OF REQUEST NODE

| RELEVANT INFORMATION OF CONTENT ID: 31330012 | RELEVANT INFORMATION REQUEST NUMBER = 3 |
|---|---|
| IP ADDRESS OF CONTENT NODE | TTL |
| 221. 23. 154. 65 | 79 |
| 131. 31. 75. 100 | 32 |
| 62. 163. 15. 105 | 156 |

RELEVANT INFORMATION b
RELEVANT INFORMATION c
RELEVANT INFORMATION d

FIG.11

INDEX INFORMATION SAVED IN STORAGE PART 12

| CONTENT ID | IP ADDRESS OF CONTENT NODE | TITLE | GENRE | NAME OF DIRECTOR |
|---|---|---|---|---|
| 30001012 | 121.43.154.65 | ○!★ | LOVE ROMANCE | SAM CAMERON |
| 12021101 | 131.31.75.100 | ■△○ | SF ADVENTURE | LARRY RAIMI |
| 21021310 | 241.43.65.132 | #♭$$ | HORROR | JAMES WACHOWSKI |
| 12021101 | 255.62.14.102 | ■△○ | SF ADVENTURE | LARRY RAIMI |

CONTENT NODE A

CONTENT NODE B

FIG.16

INDEX INFORMATION SAVED IN STORAGE PART 12

| CONTENT ID | IP ADDRESS OF CONTENT NODE | TITLE | GENRE | NAME OF DIRECTOR |
|---|---|---|---|---|
| 30001012 | 121. 43. 154. 65 | ○ ! ★ | LOVE ROMANCE | SAM CAMERON |
| 12021101 | 131. 31. 75. 100 | ■ △ ○ | SF ADVENTURE | LARRY RAIMI |
| 21021310 | 241. 43. 65. 132 | # ♭ $ $ | HORROR | JAMES WACHOWSKI |
| 12021101 | 255. 62. 14. 102 | ■ △ ○ | SF ADVENTURE | LARRY RAIMI |

INFORMATION DELIVERY SYSTEM, DELIVERY REQUEST PROGRAM, TRANSFER PROGRAM, DELIVERY PROGRAM, AND THE LIKE

CROSS REFERENCE TO RELATED APPLICATION

This is a Continuation-in-Part of International Application No. PCT/JP2005/019225 filed Oct. 19, 2005, which claims the benefit of Japanese Patent Application No. 2005-006741 filed Jan. 13, 2005 and Japanese Patent Application No. 2005-008243 filed Jan. 14, 2005. The disclosure of the prior applications is hereby incorporated by reference herein in its entirety.

BACKGROUND OF THE INVENTION

1. Field of the Invention

The present invention relates to a peer to peer (P2P) content delivery system which includes a plurality of node devices which are connected with each other via a network and, especially, relates to a technical field of an information delivery system, delivery request program, transfer program, delivery program, and the like in which content data which is to be delivered from one node device to the other is distributed and saved in a plurality of node devices.

2. Discussion of Related Art

In this kind of content delivery system, each of node devices has a list in which location information regarding content data distributed and saved in a plurality of node devices is described (for example, information which enables to specify an IP address or the like of a node device which saves the content data by designating auxiliary information such as a title of the content data: Hereinafter referred to as index information) and on the basis of index information described in the list, it becomes possible to download content data which a user wants. Such a list is common information to be used commonly among a plurality of node devices and generally is managed by a management server which manages all the content data saved on a content delivery system so that the list is delivered from the management server to each node device.

For example, in the Patent Document 1, as this kind of a management server, an index server which is most magnificent and manages all the content information in a content delivery system has been disclosed.

Moreover, in the Patent Document 2, as a method which does not use a management server, a technique using a distributed hash table (DHT) has been disclosed. In this system, a request node device which requests delivery of content inquires location of a node device, which saves content information, to a management server which manages content information to access the node device.

Furthermore, as disclosed in the Patent Document 3, pure P2P delivery system such as Gnutelia, Freenet, and Winny has been invented. However, in these systems, identification information regarding content is designated to search for the content, specify location thereof, and access thereto. In such a system, terminals communicate with each other to search and transfer the content.

Patent Document 1: Japanese Published Unexamined Patent Application No. 2002-318720
Patent Document 2: Japanese Published Unexamined Patent Application No. 2004-127189
Patent Document 3: Japanese Published Unexamined Patent Application No. 2004-185263

Meanwhile, in a peer to peer content delivery system, a node device withdraws (due to power cut-off to the node device, or partial disconnection on a network) and participates in the system with a high frequency. In addition, content data is newly saved or deleted to or from the node device with high frequency. Therefore, the above-mentioned list must be updated often. Hence, to keep the list to the latest condition, it is regarded that a management server, one that was described above, is required.

However, in a content delivery system in which a management server manages the list, the more the number of node device is increased, the more server load is increased when updating the list and, at the same time, there arises a problem that network load is concentrated on one spot, restricting even a list which can be delivered from being delivered. Therefore, this system is not preferable. Moreover, when the management server is stopped (for example, due to power outage or malfunction), the list cannot be updated. Furthermore, there is also a problem of management cost for managing a list with a server.

In addition, in a method that does not use a management server, since a content node device which retains content is not always working, when a management node device which was inquired about location of a content node device, which saves content requested to be delivered, from a request node notifies the location of the content node device based on information recorded in the list of the management node device, the request node finds upon requesting delivery of the content that the content node has already withdrawn, has been stopped (for example, due to power outage or malfunction), or the desired content has already been deleted. In such a case, the request node must search for location of a content node device from the beginning. If this occurs frequently, in a system that contains vast quantity of content or a system in which a large number of devices participate in, large amount of communication is performed between each device, causing great load to the whole of the system.

SUMMARY OF THE INVENTION

The present invention has been made in consideration of the above problems and a first aim thereof is to provide an information delivery system, a delivery request program, transfer program, delivery program, and the like which enables a request node to make a delivery request to a content node suitable for delivery of a desired content and to receive delivery of the content program.

Moreover, a second aim is to provide an information delivery system, information update program, and information update method which enables to manage and update available information of content delivery, survival condition of content node devices, and the like.

Accordingly, a first aspect of the present invention provides an information delivery system including:

a plurality of node devices which are connected each other to configure a network, the plurality of node devices comprising at least a first node device, a second node device and information saving node devices that save specific common information to be shared among the plurality of node devices, wherein:

the first node device comprises:
an identification information transmission unit for transmitting unique identification information corresponding to the specific common information to the second node device;

an information receiving unit for receiving an information regarding the information saving node devices from the information saving node devices; and a delivery request unit configured to request delivery of the specific common information a to selected one of the information saving node devices, wherein the selected information saving node device is selected from the information saving node devices which send the information regarding the information saving node devices to the first node device on the basis of the received information;

the second node device comprises:

a saving unit for saving the identification information corresponding to the specific common information and node information indicative of at least one of the information saving node devices, by associating the identification information with the node information;

a node information search unit configured to search for the node information that corresponds to the received identification information upon receipt of the identification information; and an identification information transfer unit for transferring the identification information to at least one of the information saving node devices which are indicated by the node information, when there is the node information corresponding to the received identification information in the saving unit, and the information saving node device comprises:

a judgment unit configured to judge whether or not transmission of the specific common information, indicated by the received identification information can be transmitted to the first node device which sent the identification information, upon receipt of the identification information from one of the second node devices:

an information transmission unit, when it is judged that the transmission is available by the judgment unit, for transmitting the information regarding at least one of the information saving node devices to the first node device which sent the identification information; and a delivery unit for delivering the specific common information to the first node device which sent delivery request upon receipt of delivery request for the specific common information from the first node device.

According to the above, when a first node device requests relevant information to an information saving node device such as a content node which saves specific common information such as content, the first node device receives relevant information of a plurality of information saving node devices, selects an information saving node device most suitable for delivery based on the relevant information from the plurality of information saving node devices, and performs delivery request to the selected information saving node device. Therefore, it is possible to perform delivery request after receiving relevant information to confirm that an information saving node device surely exists and, furthermore, it is possible to receive delivery of common information from a more suitable information saving node device among a plurality of information saving node devices when relevant information is received from a plurality of information saving node devices.

BRIEF DESCRIPTION OF THE DRAWINGS

FIG. 4A is an example of a table in level 1. (B) An example of a table in level 2. (C) An example of a table in level 3. (D) An example of a completed routing table.

FIG. 9 shows an example of a candidate list saved in a storage part 12 in a request node.

FIG. 11 is an example of index information saved in the storage part 12 in a cache node.

FIG. 16 shows an example of index information saved in the storage part 12 in a cache node.

DETAILED DESCRIPTION OF THE PREFERRED EMBODIMENTS

Figure 1:
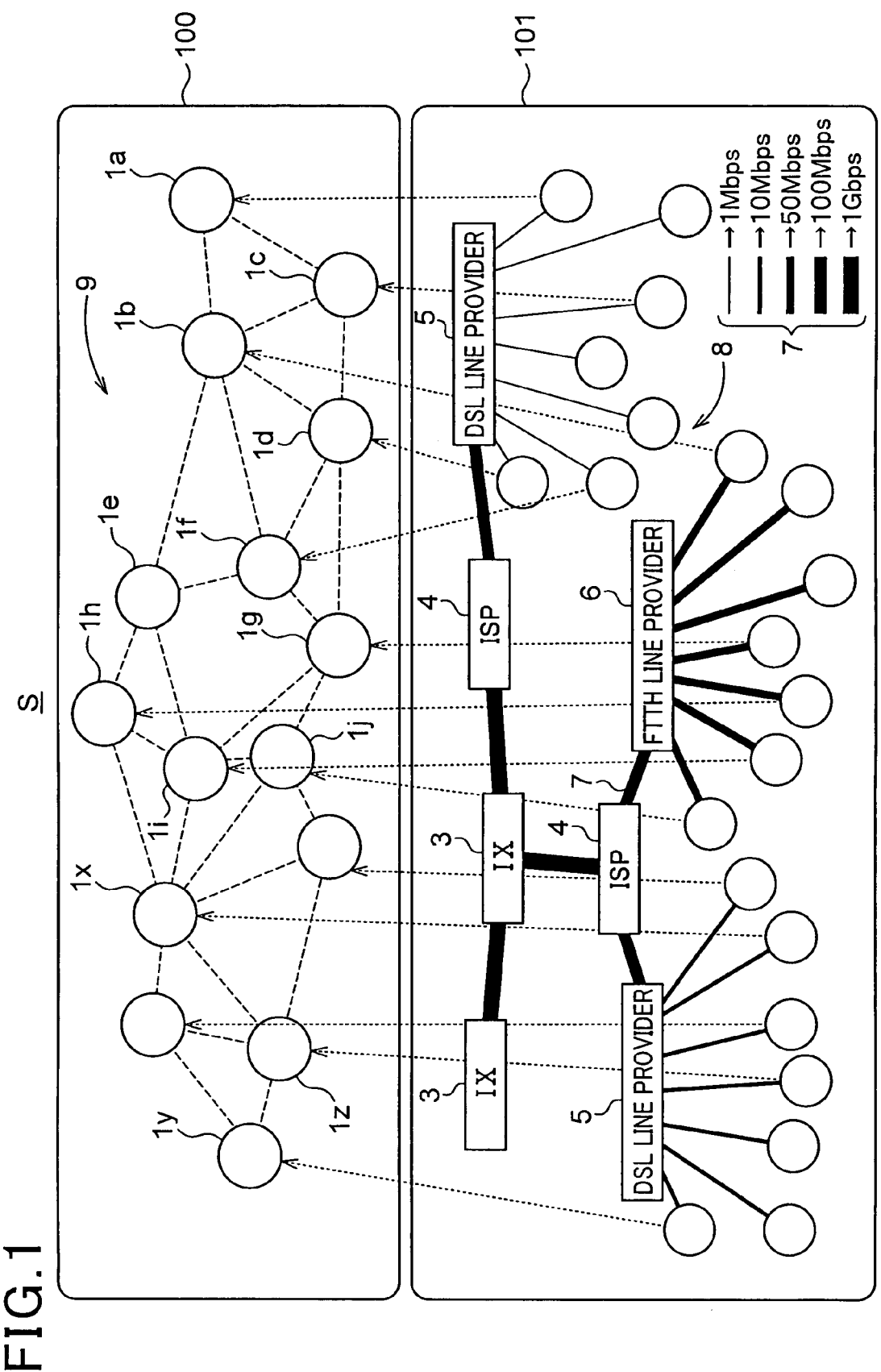
FIG. 1 shows an example of connection status of each node device in a content delivery system according to the present embodiment.

Preferred embodiments of the present invention will be described in conjunction with Figures. Hereinafter, each designation of numerical reference in the drawings is typically as follows:
1 node device
8 network
11 control part
12 storage part
13 buffer memory
14 decoder part
15 image processing part
16 display part
17 audio processing part
18 speaker
20 communication part
21 input part
22 bus
S content delivery system
A, B, C, D content node
b, C, d related information
Embodiment 1

Hereafter, a first embodiment of the present invention will be explained based on figures. Note that embodiment explained below is a case where the present invention is applied to a content delivery system.

[1. Configuration and the Like of Content Delivery System]

First, with reference to FIG. 1, general configuration and the like of a content delivery system will be explained.

FIG. 1 shows an example of connection status of each of node devices in a content delivery system according to the present embodiment.

As shown in lower rectangular frame 101 in FIG. 1, a network 8 (network in real world) of the Internet or the like is configured by an internet exchange (IX) 3, internet service provider (ISP) 4, digital subscriber line provider (or device thereof) 5, fiber to home line provider ('s device) 6, and communication line (for example, such as a telephone line or an optical cable) 7 and the like.

A content delivery system S is configured by a plurality of node devices 1a, 1b, 1c . . . 1x, 1y, 1z . . . which are connected with each other via such network 8 as communication means and is a peer to peer network system. Moreover, to each of the node devices 1a, 1b, 1c . . . 1x, 1y, 1z . . . , unique manufacturing number and internet protocol (IP) address have been assigned respectively. Note that none of manufacturing number and IP address overlaps in a plurality of node devices 1. In the explanation below, there are cases where any of node devices 1a, 1b, 1c . . . 1x, 1y, 1z . . . is called a node device 1 for the convenience of explanation.

[1-1 Overview of DHT]

Hereafter, an algorithm using a distributed hash table (hereinafter DHT) according to the present embodiment will be explained.

In the above-mentioned content delivery system S, when information is transmitted and received between the node devices 1, it is required for the node devices 1 to know IP address of the counterpart as node information.

For example, in a system in which content is shared among each node devices, a simple method is for each node device 1 to know IP addresses of all the node devices participating in the network 8. However, when there are tens or hundreds of thousand of terminals, it is not realistic to memorize the IP addresses of all the node devices 1. Moreover, when power of an arbitrary node device is turned on or off, it is required for each of the node devices 1 to frequently update IP address of the arbitrary node device and therefore, it is difficult to operate the system.

Hence, a system in which one node device 1 memorizes (saves) necessary and minimum IP addresses of node devices 1 among all the node devices and for a node device 1 of which IP address is not unknown (not saved), information is transferred between node devices 1 has been invented.

As an example of such a system, an overlay network 9 shown in the upper rectangular frame 100 of FIG. 1 is configured by an algorithm using DHT. In other words, the overlay network 9 means a network which configures a virtual network formed by using an existing network 8.

In the present embodiment, an overlay network 9 configured by an algorithm using DHT is a premise and a node device 1 provided on this overlay network 9 is called a node device 1 participating in the content delivery system S (in other words, participating in the overlay network 9). Note that participation into the content delivery system S is performed when a node device which has not participated yet sends participation request to any arbitrary node device 1 which has already participated in.

A unique number is attached to a node device 1 participating in the content delivery system S as node ID of each node device. The number is required to have a bit number which can contain maximum number of devices that the node device can operate. For example, when the number is a 128-bit number, the node device can operate $2^{128} \approx 340 \times 10^{36}$ node devices.

More specifically, a node ID of each node device 1 is a hash value obtained by hashing a unique number of each node device such as an IP address or manufacturing number by a common hash function (hash algorithm) and is distributed and located in one ID space without deviation. As such, each of the (hashed) node IDs obtained by a common hash function in such a manner has a very low possibility of having same values when the IP address or the manufacturing number differs from each other. Note that regarding hash function, since it is heretofore known, detailed explanation thereof is omitted. Furthermore, in the present embodiment, node ID is obtained by hashing an IP address (global IP address) by a common hash function.

Moreover, in the plurality of node devices 1 participating in the content delivery system S, content data (for example, a movie or music) as common information to be delivered from one node device 1 to another node device 1 is distributed and saved (stored). For the content data, a unique number is also attached to each content data (hereinafter referred to as content ID).

Then, the content ID is set to be the same length as node ID (for example, 128-bit) and a key word such as the name of the content (content title) or general information of the content (plot) is hashed by the same hash function as that used when the node ID is obtained (that is, to be provided on the same ID space as the hash value of an IP address of a node device 1). A node device 1 of which node ID is closest to the hash value of the key word (for example, upper digit numbers match the most) saves the content data, or manages location information thereof. Thus, it is possible to distribute content data on the content delivery system S without deviation. Note that a case where the same key word is used for different content data (for example, name of the content) can be assumed. In such a case, same hash values are obtained. To avoid this, a key word to be hashed can be a combination of a name of the content and copyright information (for example, a name of a performer, a director, a singer, a composer, or a lyric writer).

Figure 2:
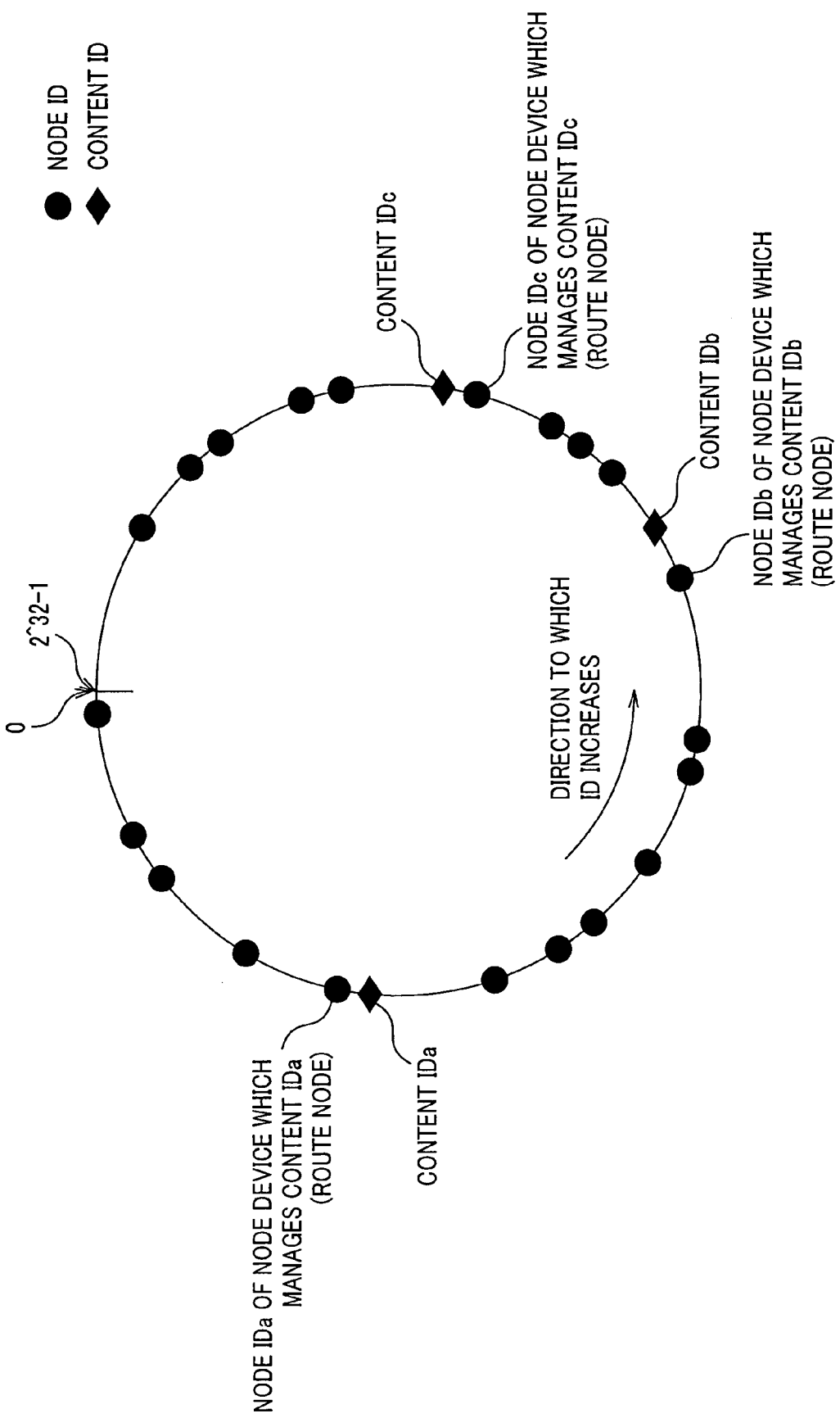
FIG. 2 is a graphical illustration of an ID space.

As such, since the node ID and content ID attached to each node device 1 and content data were generated by a common hash function, as shown in FIG. 2, they can be assumed to be distributed in a same ring-shaped ID space without much deviation. The figure graphically shows a case where a node ID and a content ID have been allocated with the length of 32-bit. A black circle in the figure denotes a node ID while a black rhombus denotes a content ID. The Id is assumed to increase in a counterclockwise direction.

Next, to which node device 1 which content is to be saved is determined by a certain rule. In the present embodiment, the rule is, "a node device which manages content data including a certain content ID is a node device 1 of which node ID is closest to the content ID". Here, definition of "close ID" is one of which difference between a content ID is the smallest and does not exceed the content ID. However, when management of each content data is allocated to each node device 1, it is required to be only consistent. In an example shown in the figure, based on this definition, a content IDa is managed by a node device having node IDa and a content IDb is managed by a node device having node IDb. Note that there may be a case where a plurality of content data is managed by a certain node device.

Here, "manage" does not mean a condition where content data is saved/retained but means "knowing to which node device 1 the content data is saved". That is, in FIG. 2, a node device 1 which has the node IDa knows to which node device 1 the content data having content Ida is saved and a node device 1 which has the node IDb and a node device 1 which has a node IDc also know to which node device 1 content data having the content IDb and content IDc are saved, respectively. Thus, a node device which knows to which node device 1 certain content data is saved is called a route node of the content data. That is, the node device 1 having node IDa is a route node of content data having content IDa, the node device 1 having node IDb is a route node of content data having content IDb, and the node device 1 having node IDc is a route node of content data having content IDc.

Moreover, a case where a route node of certain content data stops its function or content data is deleted from a node device in which content data has been saved (hereinafter referred to as simply "content node") can be assumed even when pairs of content data and route nodes are made under the rule of "a node device which manages content data having a certain content ID is a node device 1 which has a node ID closest to the content ID". Even in such a case, unless a route node confirms survival of content data and updates index information or the like of the route node itself, content data information managed by the route node remains definitely. Then, although the content data was deleted once, when the same content data is registered, a route node is selected according to the above-mentioned rule again and by the participation of a new node device, a node device different from the previous one may be selected as a new route node.

Therefore, even when pairs of content data and route nodes are made under the rule of "a node device which manages content data having a certain content ID is a node device 1 which has a node ID closest to the content ID", as the content delivery system S configures a vast network including hundreds or thousands of devices, withdrawal of a node device from the content delivery system S (due to power source cut-off or partial disconnection in the network) and participation may be performed with a high frequency and saving and deletion of content data to a node device may be also performed with a high frequency. Hence, there are actually many node devices which know a content node that saves certain content data.

Moreover, a node device which retains certain content data is not restricted to only one device. There is a case where many node devices save the one content data and participate in the content delivery system S. In such a case, each node device to be a route node may be determined respectively depending on the condition at the time when each node device participates in the content delivery system S. Hence, as a result, a certain node device may know two or more node devices (content nodes) which retain the one content data.

[1-2. Creation of a Routing Table]

Figure 3:
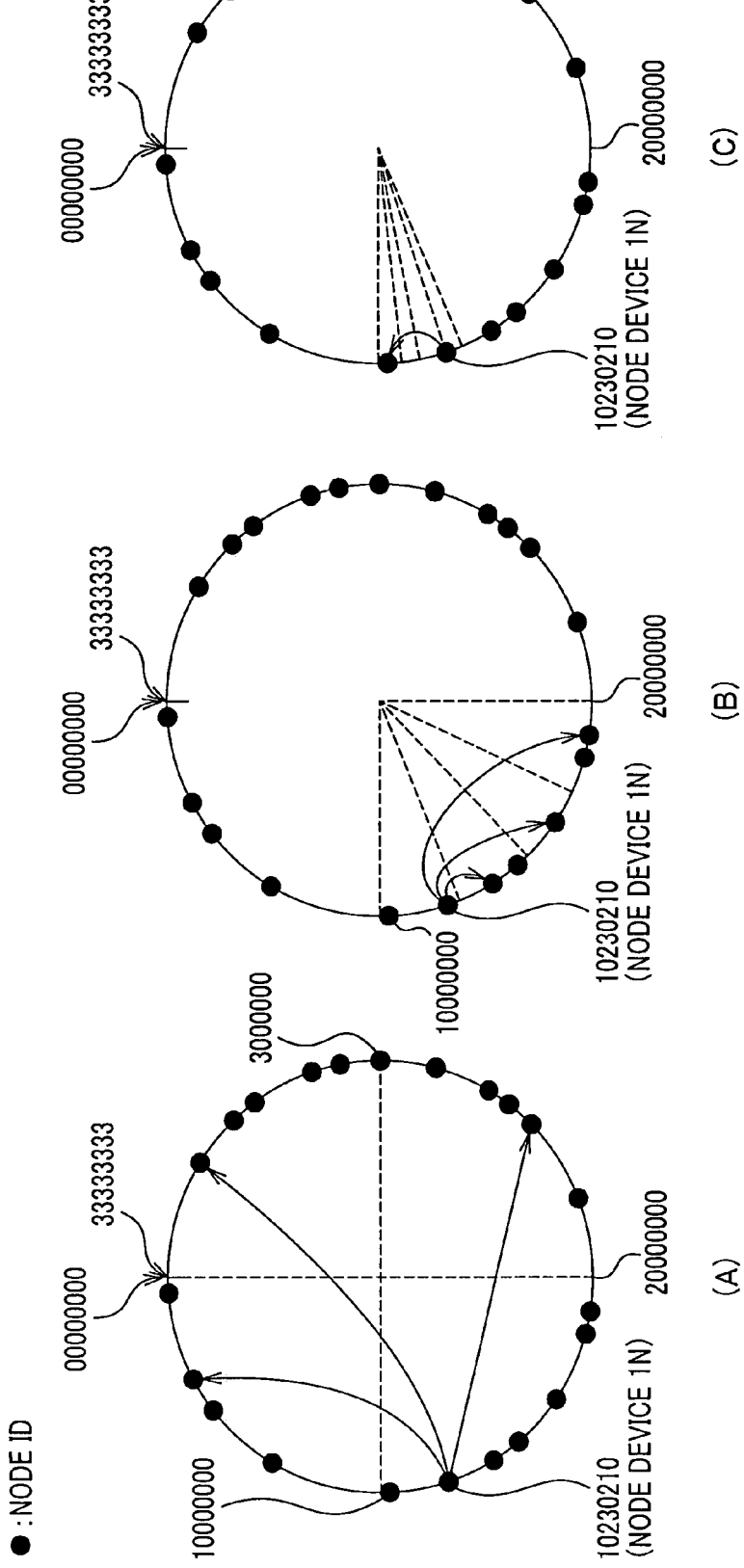
FIG. 3 shows an example where a routing table is made by DHT.

Here, with reference to FIG. 3, an example of creation method of a routing table used in DHT is explained.

FIG. 3 is a view showing an example where a routing table is created by DHT.

First, as shown in FIG. 3(A), ID space is divided into several areas. Although ID space is frequently divided into 16 areas in actuality, for the convenience of explanation, here the space is divided into four and ID is expressed by quarternary number of which bit length is 16-bit. Here, a node ID of a node device 1N is "10230210" and an example where a routing table of the node device 1N is created is explained.

(Routing in Level 1)

First, when the ID space is divided into four, there are four areas of which maximum digit number differ from each other when expressed by quarternary number, such as "0XXXXXXX", "1XXXXXXX", "2XXXXXXX", and "3XXXXXXX" (here, "X" is any of natural number from 0 to 3 and the same is applied hereinafter). Since the node ID of the node device 1N is "10230210", the node device 1N exists in left lower area of "1XXXXXXX" in the figure. Then, the node device 1N randomly selects a node device 1 existing in an area other than the area where the node device 1N exists (that is, an area other than "1XXXXXXX") and saves an IP address of the node device in a table in level 1. FIG. 4(A) is an example of a table in level 1. The second raw indicates the node device 1N itself and therefore it is not necessary to save the IP address.

(Routing in Level 2)

Next, as shown in FIG. 3(B), among four areas generated by division by the above routing, an area where the node device 1N itself exists is further divided into four to make four more areas, "10XXXXXX", "11XXXXXX", "12XXXXXX", and "13XXXXXX". Then, similarly to the above, a node device 1 existing in an area where the node device 1N does not exist is randomly selected and an IP address of the node device is saved in a table in level 2. FIG. 4(B) is an example of a table in level 2. The first raw indicates the node device 1N itself and therefore it is not necessary to save the IP address.

(Routing in Level 3)

Further, as shown in FIG. 3(C), among four areas generated by division by the above routing, an area where the node device 1N itself exists is further divided into four to make four more areas, "100XXXXX", "101XXXXX", "102XXXXX", and "103XXXXX". Then, similarly to the above, a node device 1 existing in an area where the node device 1N does not exist is randomly selected and an OP address of the node device is saved in a table in level 3. FIG. 4(C) is an example of a table in level 3. The third raw indicates the node device 1N itself and therefore it is not necessary to save the IP address and the second and fourth rows are left blank because there exists no node devices in these areas.

Thus, from level 4 to level 8, as shown in FIG. 4 (D) of routing tables, routing tables are created in a similar manner and all the 16-bit IDs are covered. The higher the level becomes, the more blank space can be found in the table. A routing table created according to the method explained above is created and possessed by all the node devices 1.

[1-3. Search Method for Content Data]

Next, with reference to FIG. 5, an example of search for a node device 1 which saves content data (hereinafter referred to as "content node") in the present embodiment will be explained.

Figure 5:
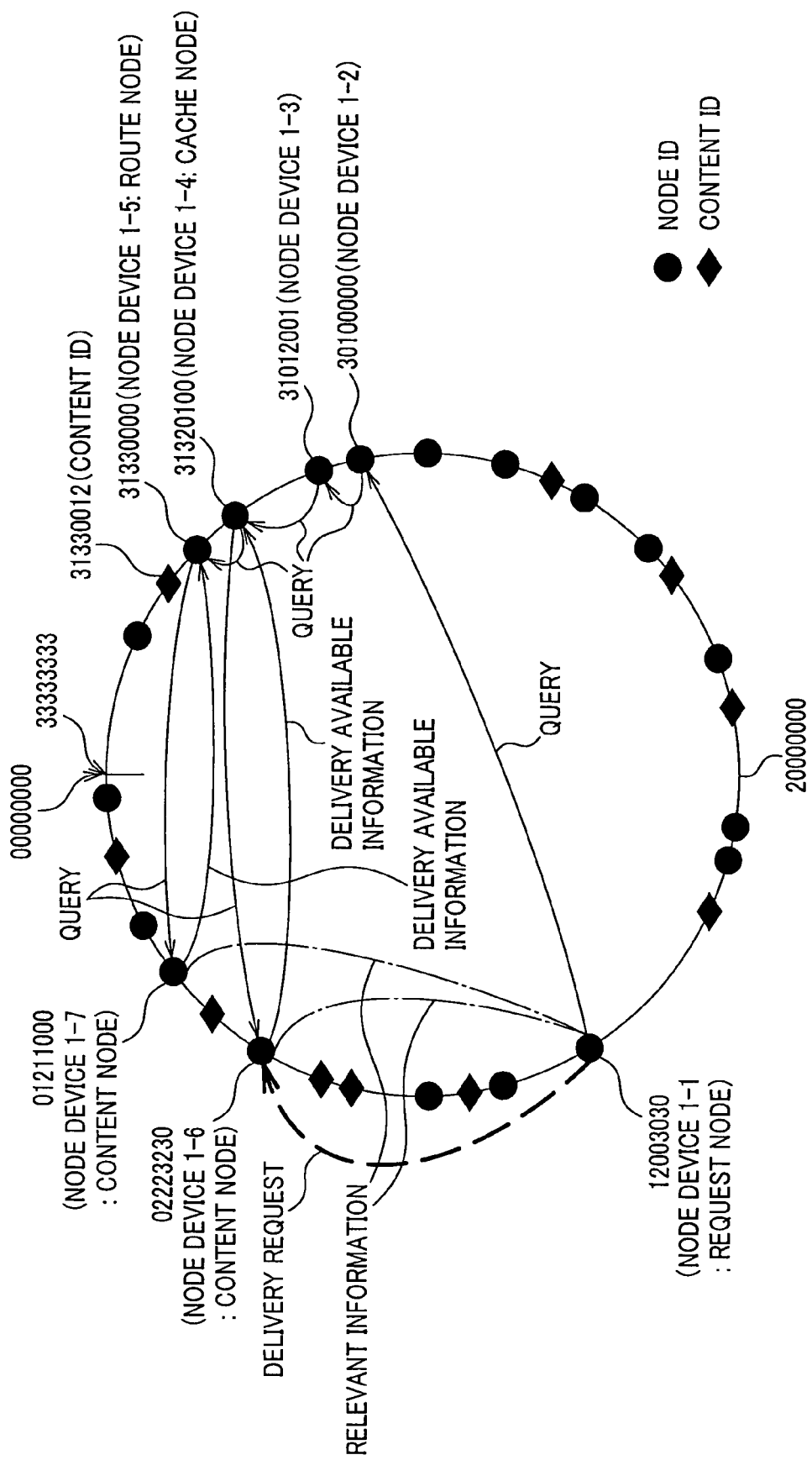
FIG. 5 shows an example where a node device 1 which saves content data is searched by DHT in the present embodiment.

FIG. 5 shows an example of a content data being searched by a DHT.

Here, an explanation will be given on a case where a node device 1-1 for node ID "12003030" (hereinafter referred to as a "request node") searches for a content node retaining content data of which content ID is "31330012". Note that as shown in the figure, node ID of a content node which retains content ID "31330012" is "00213000".

In FIG. 5, a route from a request node to a node device 1-5 which manages content data having content ID "31330012" (that is, a route node) is shown by arrows with a full line and a node device 1-4 on the route is a cache node which caches and retains index information saved by the route node.

First, the request node transmits content inquiry information (hereinafter, "content inquiry information" is referred to as "query") to a node device of which node ID is in the same area as content ID "31330012".

Here, query transmitted by the request node will be explained.

The query includes not only content ID "31330012" which indicates desired content, but also IP address information of the request node and request number information which indicates how many relevant information of the content node is requested. That is, a case where a plurality of the one content data exist in the content delivery system S can be assumed. In such a case, the request node selects one content node most suitable for delivery of the content from the plurality of content nodes retaining the desired content when requesting content delivery (selection) and performs delivery request to the selected one content node.

At this time, a criterion for the request node to select one content node is communication load information included in the relevant information of the content node. As an example of the communication load information, information indicating distance between the request node and the content node (for example, how much of time to live (TTL) field in an IP packet is reduced from its original value, or the like) can be listed.

Thus, the request node transmits not only content ID indicating desired content, but also IP address information of the request node and request number information indicating number of requested relevant information of the content node and, based on the relevant information received from the plurality of content nodes (number of the content node corresponds to the request number), more specifically, on the basis of communication load information such as TTL reduced amount included in the relevant information, requests delivery of content to one content node selected.

Note that in the following explanation of a search method of content data using FIG. 5, it is assumed that the request number is "2" so that it can be easily explained that content data can be easily found when a query is transferred on the network and that each of the found content data is retained in each content node to be deliverable.

First, the request node refers to a table of level 1 of a routing table that the request node retains and transmits a query including request number information of which request number is "2" to a node device of which node ID is in the same area as the content ID "31330012". That is, since content ID "31330012" is in an area of "3XXXXXXX", among all the node devices 1 in the area of "3XXXXXXX", the query is transmitted to a node device 1-2 of which IP address is known by the request node (that is, IP address is saved in the routing table of the request node).

According to the example shown in FIG. 5, since address of the node device 1-2 of which node ID is "30100000" has been saved in the routing table of the request node, the request node transmits the query to the node device 1-2 of which node ID is "30100000".

Next, the node device 1-2 which received the query refers to index information retained by the node device 1-2 itself, confirms existence of information of content node which corresponds to the content ID "31330012" and, when there is no information, refers to a table of level 2 of a routing table retained by the node device 1-2 itself to transfer the query to a node device 1-3 of which IP address is known to the node device 1-2, among all the node devices 1 belonging in the area of "31XXXXXX".

Thus, to an upper stream node device, that is, a node device between the request node and the route node, the query is transferred and by matching the content ID from its upper digit, the query approaches the route node.

Then, the node device 1-3 which received the query from the node device 1-2 refers to index information retained by the node device 1-3 itself, confirms existence of information of content node which corresponds to the content ID "31330012" and, when there is no information, refers to a table of level 3 of a routing table retained by the node device 1-3 itself to transfer the query to a node device 1-4 of which IP address is known to the node device 1-3 (node ID 31320100), among all the node devices 1 belonging in the area of "313XXXXX".

The node device 1-4 which received the query from the node device 1-3 refers to index information retained by the node device 1-4 itself and confirms existence of information of content node which corresponds to the content ID "31330012". Since the node device 1-4 is the above-mentioned cache node, the node device 1-4 can obtain at least one information of the content node. Then, the node device 1-4 transfers the query, to which instruction information to instruct the transmission of relevant information has been attached, to the content node (a node device 1-6), receives delivery available information from the content node, and updates the request number of the request information included in the query from "2" to "1". Then, the node device 1-4 refers to a table of level 4 of a routing table retained by the node device 1-4 itself to transfer the query to a node device 1-5, which is a route node and of which IP address is known to the node device 1-4, among all the node devices 1 belonging in the area of "3133XXXX". Note that the request number information includes, other than the request number, IP address information of content nodes which have transferred the query as update history and a request number sent from the original requester (this number is not updated). When the original request number and current request number differ from each other, it is understood that the query has been updated.

Finally, when the query reaches the node device 1-5 which manages the content data, that is, a route node, the route node performs a search in index information managed by the route node itself based on the content ID "31330012" included in the query and confirms existence of information of a content node to which the query has not been transmitted and corresponds to the content ID "31330012". Then, when the content node (a node device 1-7) is found, the route device transfers the query to which instruction information to instruct the content node to transmit relevant information to the request node has been attached to the content node.

The content nodes which have received the query (the node devices 1-6 and 1-7) then transmit relevant information to the request node as shown by broken lines in FIG. 5, respectively. The request node selects a content node on the basis of communication load information such as reduces amount of time to live (TTL) field in an IP packet included in the received relevant information and transmits delivery request, which requests delivery of content, to the content node (according to the example shown in FIG. 5, the node device 1-6) as shown by an arrow with a broken line.

Thus, it is possible to perform delivery request after unfailingly confirming the existence by receiving relevant information. Further, this method can be applied when there are a plurality of content nodes having arbitrary content in the content delivery system S.

Moreover, by requesting relevant information of a plurality of content nodes (by making the request number a plural number), it is possible to select a more suitable content node by comparing each of relevant information transmitted from the plurality of content nodes and transmit the delivery request.

[1-4 Registration Method of Content Data]

A case where, for example, a node device 1 discloses new content data so that other node devices on the content delivery system S can see it in the content delivery system S configured as above, will be explained. The node device 1 is a content node as an information saving node device which retains (saves) the content.

The content node obtains content ID from the title or the like of the content and transmits a disclosure message to a node device having the same node ID as the content ID (at this point of time, it is not known yet whether the node device exists or not). The disclosure message is, similarly to the query, transferred from one node device to another according to the routing table. When the message is transferred to a node device 1 having a node ID which is the closest to the content ID included in the disclosure message and the node device 1 judges that there is no other node device as a transmission destination for the message, the node device judges that the node device 1 itself must become a route node for the content and saves the content ID, auxiliary information (attribute information such as title or genre, copyright information such as name of the director, or the like) and IP address of the content node as index information.

[2. Configuration of Node Device and the Like]

Next, with reference to FIG. 6, configuration and function of a node device 1 will be explained. Note that according to the processing performed by each node device, each of the node device 1 functions as a request node as a first node device which inquires location of content, a cache node as a second node device which receives a query from the request node or a terminal on a route, a route node as a second node device and a management node device which manages the content, and a content node as an information saving node device which retains content as specific common information which is a target of inquiry from the request node. However, the configuration thereof is the same.

Figure 6:
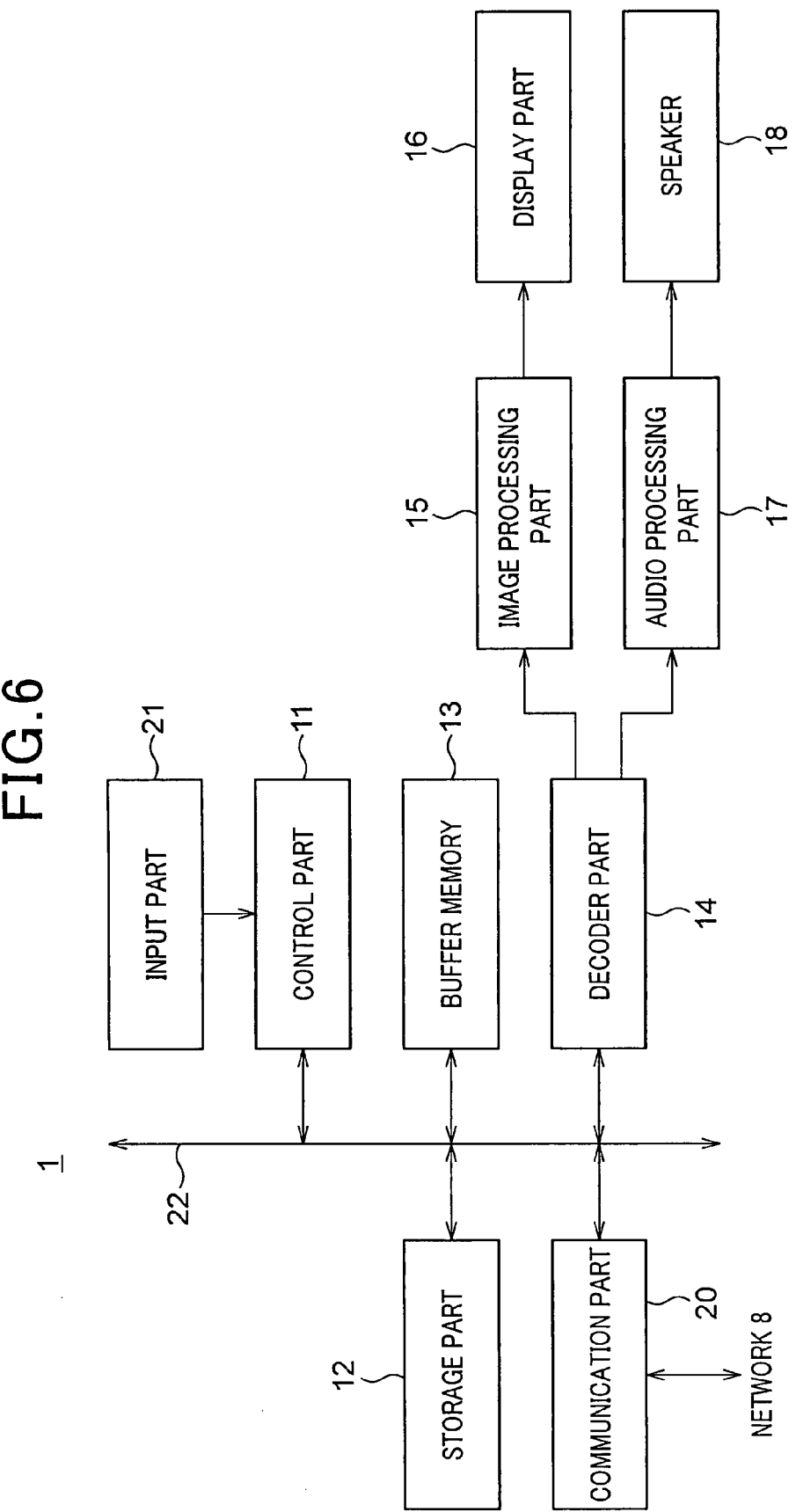
FIG. 6 shows an example of schematic structure of the node device 1.

FIG. 6 is a view showing an example of schematic structure of the node device 1.

Each of the node device 1 is configured by including, as shown in FIG. 6, a control part 11 which is a computer configured by having a CPU having computing function, a RAM for work, and a ROM for storing various data and programs, a storage part 12 configured by an HDD or the like for saving and retaining (storing) the content data, the index information, DHT and programs, and the like (some node devices 1 do not save the content data), a buffer memory 13 for temporarily storing received content data, a decoder 14 for decoding (stretching data or decrypt) encoded video data (image information 9 and audio data (voice information) included in the content data, an image processing part 15 for performing predetermined graphic processing to the decoded video data or the like to output the data as video signal, display part 16 such as CRT or liquid crystal display for displaying image based on the video signal outputted from the image processing part 15, audio processing part 17 for converting the decoded audio data by digital/analog (D/A) conversion into analog audio signal and thereafter amplifying the converted signal by an amplifier to output, a speaker 18 for outputting the audio signal outputted from the audio processing part 17 as acoustic wave, communication part 26 for performing communication control of information between node device 1 via the network 8, and input part 21 which receives instruction from a user and provides instruction signal corresponding to the instruction to the control part 11 (for example, such as a key board, a mouse, or an operation panel) and the control part 11, the storage part 12, the buffer memory 13, the decoder part 14, and the communication part 20 are connected with each other via a bus 22.

Then, the CPU in the control part 11 performs various programs saved in the storage part 12 or the like to control the whole of the node devices 1 and functions as the request node as the first node device, the cache node as the second node device, the route node as the second node device and the management node device, and the content node as the information saving node device.

When the node device 1 functions as the request node, the control part 11 functions as identification information transmission means, relevant information receiving means, and delivery request means, when the node device 1 functions as the cache node or the route node, the control part 11 functions as saving means, node information search means, identification information transfer means, and waiting time setting means, and when the node device 1 functions as the content node, the control part 11 functions as judgment means, relevant information transmission means, delivery means and judgment information reply means.

[3. Operation of Content Delivery System]

Next, operation of each node device in the content delivery system S will be explained.

Here, processing performed by each node when the request node performs content delivery request is explained in detail. As mentioned above, all the node devices 1 included in the content delivery system S can be any of a request node, a cache node, a route node, a content node, a node on a route, or any other node, etc.

For example, when a user operates the input part 21 provided to the node device 1 to instruct inquiry of location of desired content data as specific common information, the node device 1 functions as a request node as s first node device. Moreover, a node device 1 which received a query from the request node or from a node device existing in between for inquiry of location of content data functions as a cache node or a route node, while a node device 1 which received a query, to which instruction information which instructs transmission of relevant information has been attached, from a route node or a cache node functions as a content node.

Hereafter, processing in node device 1 when the node device 1 functions as each node will be explained by use of FIGS. 7 to 12.

[3-1. Processing in Request Node]

First, using FIGS. 7 and 8, processing in a request node will be explained.

Figure 7:
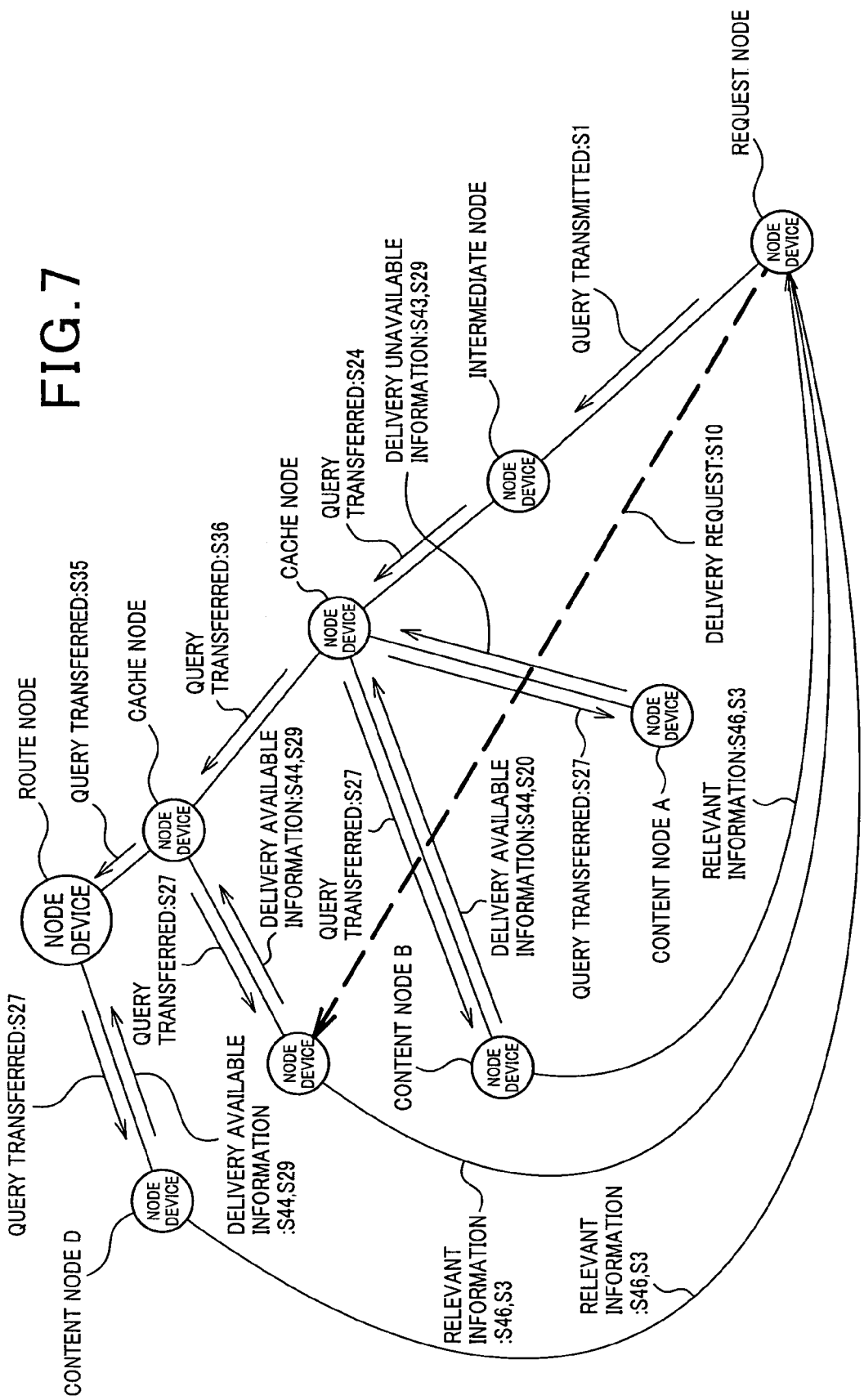
FIG. 7 is a graphical illustration in which transmission and receiving of various information between each node is expressed as a spanning tree.

FIG. 7 is a graphical illustration in which transmission and receiving of various information between nodes is expressed as a spanning tree. In the figure, an intermediate node is a node which does not have index information valid to a targeted content and a cache node is a node which has the index information.

Figure 8:
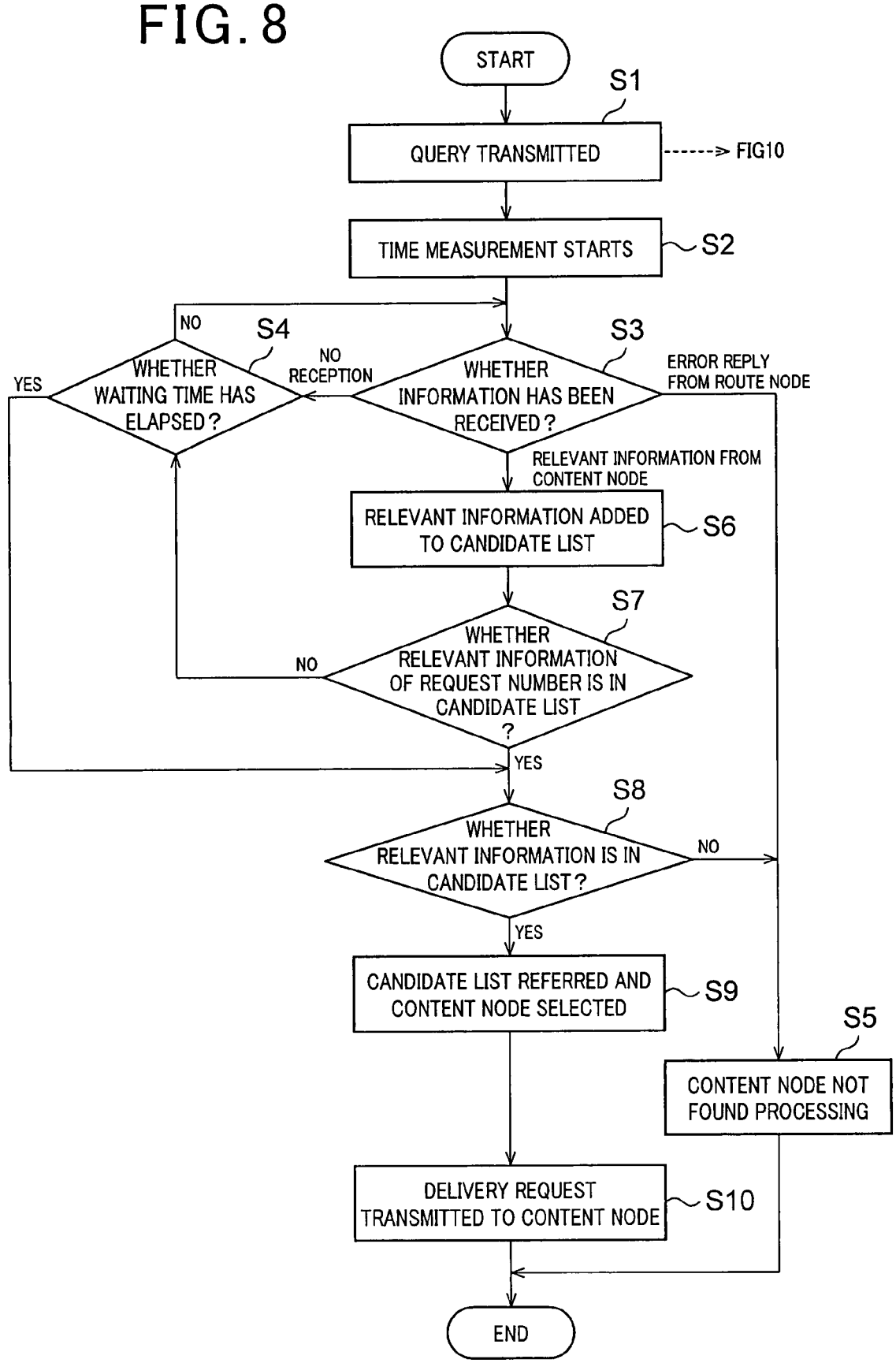
FIG. 8 is a flow chart showing processing by a control part 11 in a request node.

FIG. 8 is a flow chart showing processing of a delivery request program saved in the control part 11 of the request node performed by the control part 11.

First, a user operates the input part 21 and inputs title or the like of desired content as specific common information and relevant information of a content node which retains the content is requested. At this time, request number of the requested relevant information is also inputted.

When inquiry of location of desired content data is thus performed, the control part 11 functions as identification information transmission means, hashes title or the like of the content to generate content ID indicating the content data (unique identification information corresponding to specific common information) and, at the same time, transmits a query including the content ID thus generated, IP address information of the request node, and request number information indicating a request number inputted by the input part 21 to other node devices 1 referring to a routing table saved in the storage part 12 (Step S1). Selection method of the other node devices 1 follows a method explained in detail in [1-3. Search method for content data]. According to the example shown in FIG. 7, the query is transmitted to an intermediate node, which is neither a cache node nor a route node. Note that the request number is 3 in this example.

Moreover, when the query is transmitted in Step S1, a candidate list is prepared in the storage part 12 to save relevant information to be transmitted later from each content node. Note that with regard to the candidate list, detailed explanation thereof will be given in processing in Step S9.

Subsequently, by use of a built-in clock or the like which is provided in the device, measurement of time starts (Step S2).

After that, whether any information has been received from other node devices or not is judged (Step S3) and when no information has been received (Step S3: no received information), processing proceeds to Step S4 to judge whether a predetermined waiting time (for example, 10 seconds or the like) has elapsed or not and when the time has elapsed (Step S4: Yes), the processing proceeds to Step S8, while the time has not elapsed (Step S4: No), the processing moves to Step S3 to wait for reception of information.

Meanwhile, when information received in Step S3 is an error reply from a route node (Step S3: error reply from route node), predetermined content node not-found processing such as displaying a message of "Specified content could not be found" or the like is displayed on the display part 16 or the like (Step S5) and the processing is finished.

On the other hand, when information received in Step S3 is relevant information from a content node (Step S3: relevant information from content node) (that is, when the control part 11 functions as relevant information receiving means), the relevant information is added to the candidate list of the storage part 12 (Step S6). According to an example shown in FIG. 7, relevant information has been received from a content node B, a content node C, and a content node D, respectively.

Then, the candidate list saved in the storage part 12 is referred to judge whether relevant information saved in the candidate list exists as many as the request number inputted when the query was transmitted in Step S1 (Step S7) and when the relevant information does not satisfy the request number (Step S7: No), the processing proceeds to Step S4 and waits for reception of information during the period of the reply waiting time (that is, Step S4: No) and when there are more relevant information than the request number (Step S7: Yes), the processing proceeds to Step S8.

Then, in Step S8, whether there is at least one relevant information in the candidate list of the storage part 12 is judged (Step S8) and when there is no relevant information in the candidate list (Step S8: No), the processing proceeds to Step S5 to perform predetermined content node not-found processing (Step S5) and processing is finished. Note that such a case occurs when a predetermined reply waiting time elapses without receiving any information from either a route node or a content node in Step S3.

Moreover, in Step S8, when there is at least one relevant information in the candidate list (Step S8: Yes), the relevant information saved in the candidate list is compared with each other and a most suitable content node is selected (Step S9).

Here, an example of a candidate list saved in the storage part 12 of the request node is shown in FIG. 9. This figure is a candidate list generated in the storage part 12 when relevant information is received respectively from three content nodes, content node B, to D, as in the example of FIG. 7.

The content node must make it a rule to transmit the relevant information after setting 256 as initial value in TTL field in an IP packet. In the example of FIG. 7, TTL as communication load information included in relevant information b received from the content node B has been reduced to "79" and TTL as communication load information included in relevant information c received from the content node C has been reduced to "32", while TTL as communication load information included in relevant information d received from the content node D has been reduced to "156". Therefore, it can be understood that a content node which has least relays, such as a router, between the request node is content node C indicated by the relevant information c.

Hence, it can be judged that among content nodes B to D, the content node C indicated by the relevant information c has the least communication load in the network and in the processing of Step S9, the request node selects the content node C.

Then, the control part 11 functions as delivery request means, performs delivery request to the selected content node (Step S10), and the processing is finished. More specifically, the control part 11 obtains the IP address "131.31.75.100" of the content node C included in the relevant information c and using the IP address as destination, performs delivery request to the content node C as shown by an arrow with a broken line in FIG. 7.

[3-2. Processing in Cache Node and Route Node]

Figure 10:
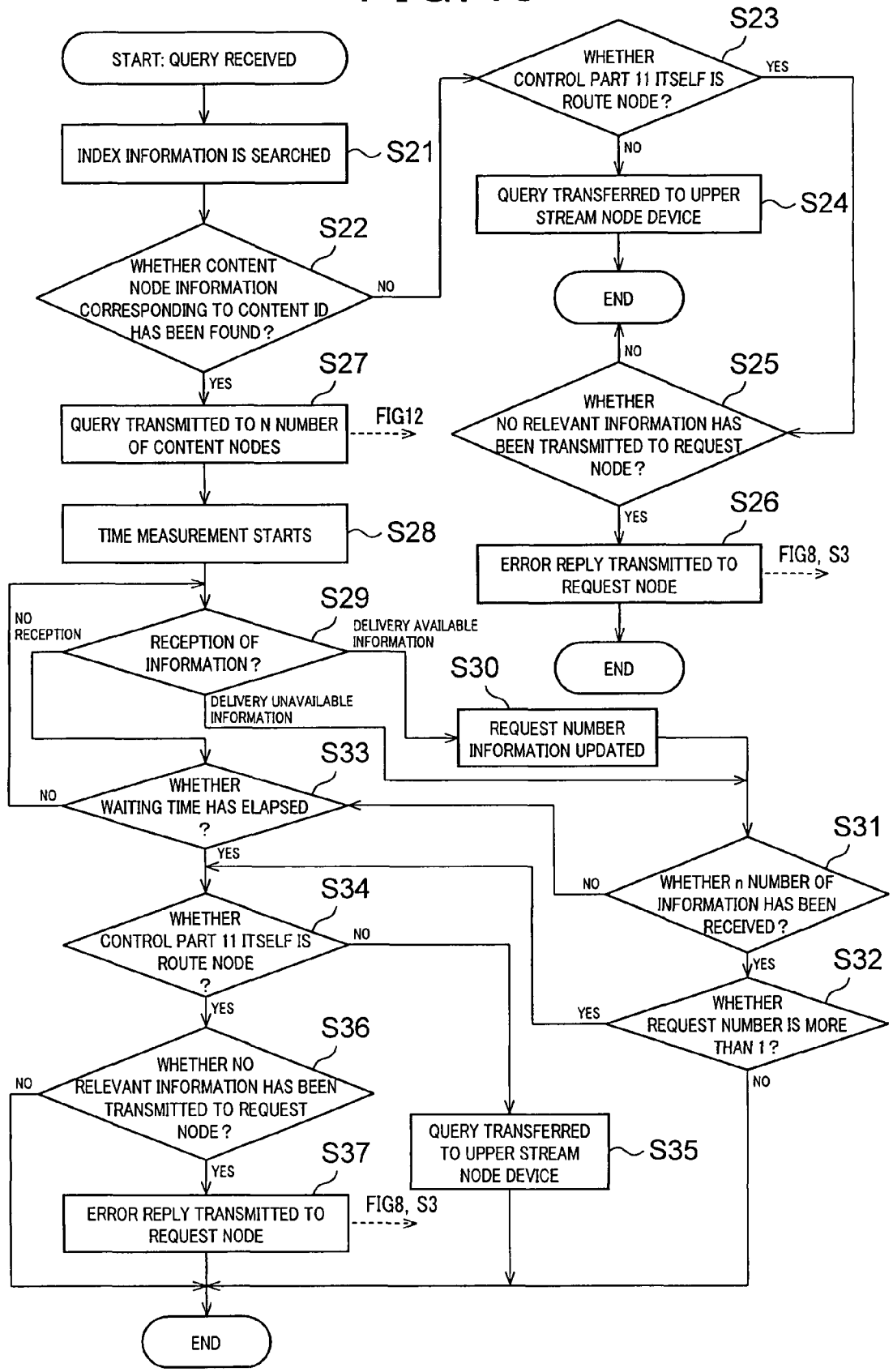
FIG. 10 is a flowchart showing processing by the control part 11 in a cache node or a route node.

Next, using FIGS. 10 and 11, processing in a cache node and a route node will be explained. FIG. 10 is a flow chart showing transfer processing which is performed when a transfer program saved in the control part 11 in a cache node or a route node is performed by the control part 11. FIG. 11 is an example of index information saved in the storage part 12.

The processing starts with reception of a query transmitted from other node device in the content delivery system S including the request node and the cache node. Note that to the query, instruction information to instruct transmission of relevant information toward the request node is not attached. In case the instruction information has been attached, since the node is a content node, processing follows procedures in the later described [3-3. Processing in content node.

First, the control part 11 functions as node information search means, recognizes content ID as identification information included in the received query, and searches for content node information corresponding to the content ID (auxiliary information such as IP address of a content node or a title as node information) from index information saved in the storage part 12 of the control part 11 (Step S21).

Then, it is judged whether content node information corresponding to the content ID has been found or not (Step S21) and when not found (Step S22: No), the control part 11 judges whether the control part 11 itself is a route node or not (Step S23) and when the control part 11 itself is not a route node (Step S23: No) the query is transferred to an upper stream node device, that is, a node device located between the control part 11 and a route node (Step S24), and the processing is finished. Note that when the query is transferred, instruction information to instruct transmission of relevant information to the request node is not attached. According to the example shown in FIG. 7, the query has been transferred from an intermediate node to a cache node.

On the other hand, when the control part 11 itself is a route node in the judgment in Step S23, it is judged whether one or more relevant information has been transmitted to the request node while the query is transferred or not (Step S25).

For example, when one or more relevant information has been transmitted, as described in later processing in Step S30, request number information included in the query is updated and therefore, when the request number information is updated, information which shows existence of update history is attached to the request number information. For this purpose, in the request number information, request number from the original requester (this number is not updated) is included other than the request number and when the original request number and the current request number differ from each other, it is understood that the query has been updated. In Step S25, when it is judged that there is no update history in the request number included in the query and no relevant information has been transmitted to the request node (Step S25: Yes), the control part 11 functions as error reply means and transmits an error reply to the request node (Step S26) and the processing is finished. Meanwhile, when there is update history in the request number information of the received query, that is, one or more relevant information has been transmitted to the request node (Step S25: No) the processing is finished.

Moreover, in the processing in Step S22, when n number of content node information corresponding to content ID has been found from index information of the storage part 12 (Step S22: Yes), the control part 11 functions as identification information transmission means and transmits the query to n number of content nodes (Step S27). At this time, when less than the request number of content node information has been found from the storage part 12, the query is transmitted to all the found content nodes. When more than the request number of content node information has been found, arbitrary node is selected for the exceeding number and the query is transmitted.

Explaining more specifically based on an example shown in FIG. 11, when the content ID included in the query is "12021101", two information regarding content nodes corresponding to the content ID (auxiliary information such as IP address of a content node, a title, or the like) are found from index information of the storage part 12. When the request number is more than 2, in Step S27, the query is transferred to both IP addresses as node information of the found content nodes "131.31.75.100" and "253.62.14.102". When the request number is 1, the query is transferred to one of the nodes which has been arbitrarily selected. Note that when transferring the query to a content node, the transfer is performed after instruction information to instruct transmission of relevant information to the request node has been attached. This is to cause the content node to recognize that the node has received the query as a content node (instead, message type may be changed for a query transmitted from a request node and a query from a cache node or a route node). According to the example shown in FIGS. 7 and 11, because request number is 3, the query is transferred to both a content node A of which IP address is "253.62.14.102" and a content node B of which IP address is "131.31.75.100". Subsequently, the control part 11 functions as waiting time setting means to set waiting time for waiting for judgment information from a content node (delivery available information as available information or delivery unavailable information as unavailable information) and begins to measure time by use of a built-in clock provided in the device (Step S28).

Later, the control part 11 judges whether judgment information has been received from a content node or not (Step S29) and when delivery available information as available information has been received, (Step S29: delivery available information), the control part 11 functions as update means to update the request number information so that the request number thereof is updated by subtracting "1" from the request number which is indicated by request number information included in the query (Step S30) and the processing proceeds to Step S31.

Then, when delivery unavailable information has been received in Step S29 from the content node, or after update has been performed in Step S30, to confirm whether there is any reply from all of n number of content nodes to which the query was transferred in Step S27, the control part 11 judges whether n number of information has been received or not (Step S31). As a result of judgment, when n number of information has not been received (Step S31: No), the processing proceeds to Step S33. On the other hand, when n number of information has been received (Step S31: Yes), the processing proceeds to Step S32 and as a result of update in Step S30, whether the request number is 1 or more or not is judged (Step S32). When the request number is not 1 or more (that is, the request number is 0) (Step S32: No), the processing is finished.

On the other hand, when, as a result of update in Step S30, the request number is 1 or more (Step S32: Yes), the request number after update is included in the query as new request number information and the processing proceeds to Step S34. Note that upon update, node information such as IP address of a content node which transmitted the delivery available information is attached to the request number information. This is to instruct an upper stream node device to exclude the content node from a target of search when the query has been transferred to the upper stream node device. According to the example shown in FIG. 7, while the content node B transmits delivery available information to the cache node, the content node A transmits delivery unavailable information to the cache node. Therefore, the cache node subtracts "1" from the request number, updates the request number information, and attaches the IP address of the content node B "131.31.75.100", which transmitted the delivery available information, to the query and transmits the query.

Meanwhile, when, in Step S29, neither delivery available information nor delivery unavailable information has been received (Step S29: no reception) and when, in Step S31, it is judged that n number of information has not been received yet (Step S31: No), the processing proceeds to Step S33 and judges whether a predetermined waiting time (for example, 5 seconds or the like) has elapsed or not. When the predetermined waiting time has elapsed (Step S33: Yes), the processing proceeds to Step S34 and when the waiting time has not elapsed (Step S33: No), the processing proceeds to Step S29 and waits for reception of information.

Then, when it is judged that there is still more than 1 request number in Step S32, or the waiting time has elapsed in Step S33, it is judged whether the control part 11 itself is a route node or not (Step S34) and when the control part 11 is not the route node (Step S34: No), the query is transmitted to an upper stream node device, that is, a node device located in between the control part 11 and the route node (Step S35) and the processing is finished. At this time, instruction information to instruct transmission of relevant information is not attached.

On the other hand, when the control part 11 itself is a route node (Step S34: Yes), it is judged whether at least one relevant information has been transmitted to the request node while the query was transferred from the request node based on the information regarding update history of the request number information included in the query or the like (Step S36). When at least one relevant information has been transmitted to the request node (Step S36: No), the processing is finished; on the other hand, when no relevant information has been transmitted to the request node (Step S36: Yes), an error reply is transmitted to the request node (Step S37) and the processing is finished.

[3-3. Processing in Content Node]

Figure 12:
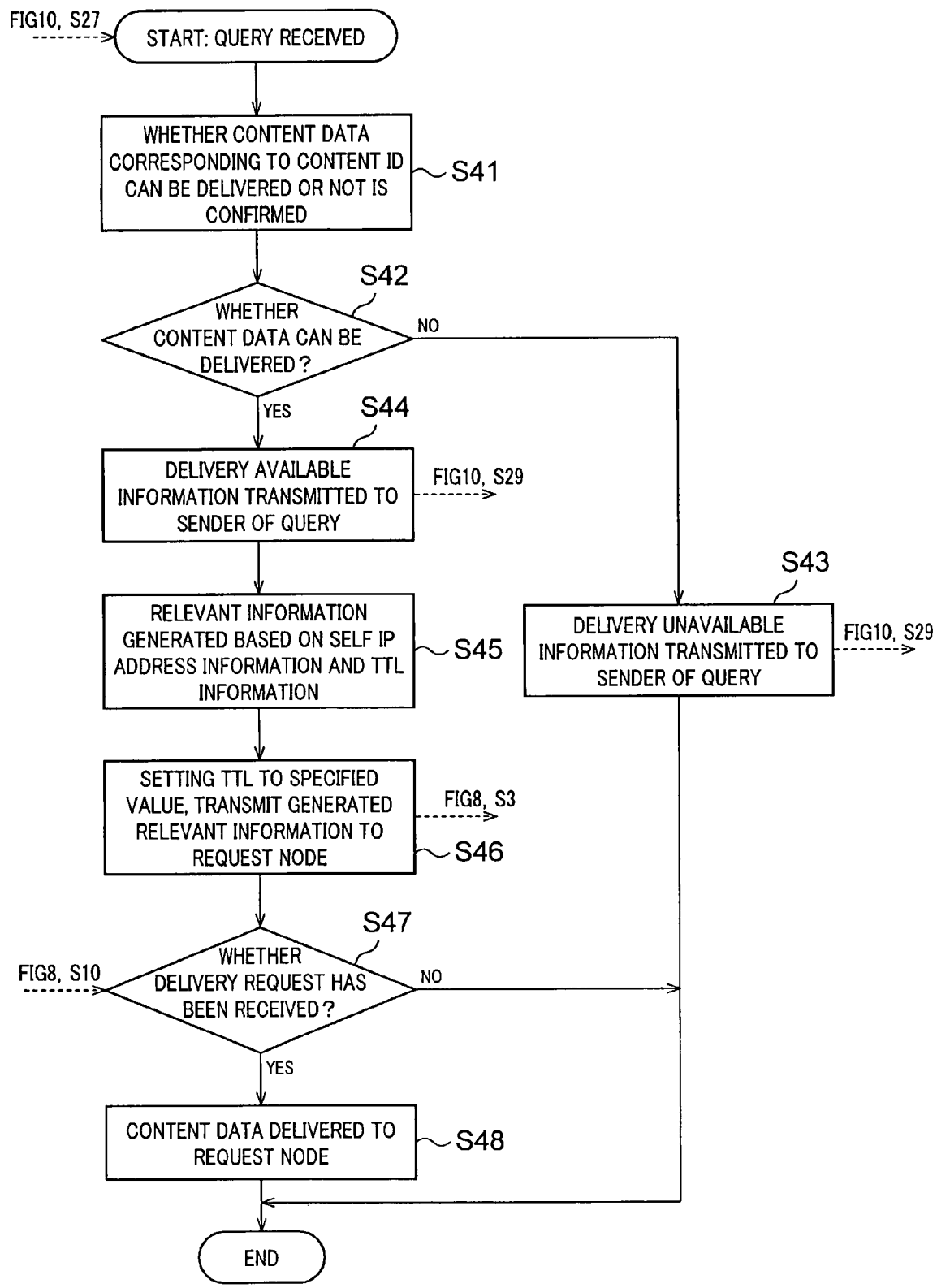
FIG. 12 is a flow chart showing processing by a control part 11 in a content node.

Next, using FIGS. 7 and 12, processing in a content node will be explained. FIG. 12 is a flow chart showing processing performed when a delivery program saved in a control part 11 of a content node is performed by the control part 11.

The processing starts with reception of a query transmitted from a route node or a cache node. Note that to the query, instruction information to instruct transmission of relevant information toward the request node is attached. In case the instruction information is not attached, processing follows procedures in the above-mentioned [3-2. Processing in route node and cache node].

First, it is confirmed whether delivery of content data corresponding to a content ID included in the query is available or not (Step S41). More specifically, whether there is content data corresponding to the content ID included in a query received by the storage part 12 or not is confirmed first. This is because there may be a case where the content has already been deleted. When there is content data, then, it is confirmed whether the content data can be delivered to the request node or not. This is because in case where the content data is being delivered to another node device or the like and the quality of the content data is low, there may be a case where smooth delivery to the request node is difficult.

Then, the control part 11 functions as judgment means and judges whether the content data can be delivered or not (Step S42). As a result of the judgment, when it is judged that the content data cannot be delivered (Step S42: No), the control part 11 functions as judgment information reply means, transmits (replies) delivery unavailable information as unavailable information to the route node or the cache node which transmitted the query to the content node (Step S43), and finishes the processing. According to the example shown in FIG. 7, the content node A transmits delivery unavailable information to the cache node.

On the other hand, when, as a result of judgment in Step S42, it is judged that the content data can be delivered (Step S42: Yes), the control part 11 functions as judgment information reply means and transmits (replies) delivery available information as available information to the route node or the cache node which transmitted the query to the content node (Step S44). According to the example shown in FIG. 7, the content node B transmits delivery available information to the cache node and the content nodes C and D transmit (replies) delivery available information to the route node.

That is, by replying delivery available information or delivery unavailable information as judgment information to the route node or the cache node, which transmitted the query to the content node, it is possible to cause the route node or the cache node which transmitted the query to recognize whether relevant information is transmitted from the content node to the request node in later described processing in Step S46.

Subsequently, in the processing in Step S45, relevant information to be transmitted to the request node is generated on the basis of an IP address of the content node itself (Step S45).

Then, the control part 11 functions as relevant information transmission means, sets TTL value to a predetermined value (for example, 256) and transmits the relevant information thus generated to the request node (Step S46). According to the example shown in FIG. 7, content nodes B to D transmit relevant information to the request node.

Next, it is judged whether delivery request has been received from the request node or not (Step S47). When the request has been received (Step S47: Yes), the control part 11 functions as delivery means, delivers content data corresponding to the content ID to the request node (Step S48) and finishes the processing. On the other hand, when the delivery request has not been received (Step S47: No), it can be judged that the control part 11 was not selected by the request node. Therefore, the processing is finished.

Note that when delivery request is not received after a predetermined period of time elapsed after setting waiting time following transmission of relevant information to the request node in Step S46, it can be assumed in Step S47 that delivery request has not been received.

As explained above, according to the present embodiment, when an inquiry about location of content data is performed by a request node, the request node receives relevant information regarding a plurality of node devices, selects one content node which is most suitable for delivery on the basis of the relevant information from the plurality of node devices, and performs delivery request only to the selected content node. Therefore, it is possible to perform delivery request after unfailingly confirming existence of the content node by receiving the relevant information.

Moreover, this method can be applied even when there are a plurality of content nodes. Especially, when a plural number of request number is set, it is possible to receive delivery from a most suitable content node from a plurality of content nodes by comparing relevant information.

Further, when content cannot be found by a route node, an error reply is transmitted to the request node. Therefore, the request node can easily understand that desired content does not exist on the content delivery system S.

In addition, whether the desired content can be delivered or not is judged by a content node and when the delivery is not available, delivery unavailable information is transmitted to a route node or a cache node which transmitted the query. Therefore, the route node or the cache node which transmitted the query recognizes that the content node cannot deliver the content. Hence, when the route node transmitted the query, an error reply is transmitted to the request node to cause the request node to easily understand that the desired content does not exist on the content delivery systems, while when the cache node transmitted the query, the query can be transferred to an upper stream node device, that is, a node device located between the route node and the content node to enable search for the content.

Furthermore, since the request node can freely set request number and can include the request number in a query including content ID, a route node or a cache node can update the request number by subtracting the number of delivery available information received from a content node. Therefore, it is possible for the request node to obtain as many relevant information as the request node requests. Hence, when the request number of relevant information is set to be large, there is an advantage that scope of search becomes large and more suitable content node can be selected, while when the request number of relevant information is set to be small, there is an advantage that one content node can be selected more quickly. Therefore, a user can change the setting depending on the purpose.

Still furthermore, in Step S28 and Step S32 in the processing of a route node or a cache node, waiting time is set and when a predetermined period of time elapses, same processing as receiving delivery unavailable information from a content node is to be performed. Therefore, when a trouble such as a content node is completely down occurs, processing is performed appropriately.

Moreover, since a content node transmits communication load information such as TTL as relevant information to the request node for judgment of communication load in the communication route on the network, the request node compares communication load of each content node and can select a content node connected via a communication route having a relatively small communication load, enabling delivery of content from the content node to the request node with a small communication load, while reducing communication load of the whole of the system.

Embodiment 2

Hereafter, a second embodiment of the present invention will be explained with reference to figures. Note that the embodiment to be explained below is an embodiment in which the present invention is applied to a content delivery system.

First, with reference to FIG. 13, a search method for a node device 1 which saves content data according to the present embodiment will be explained.

Figure 13:
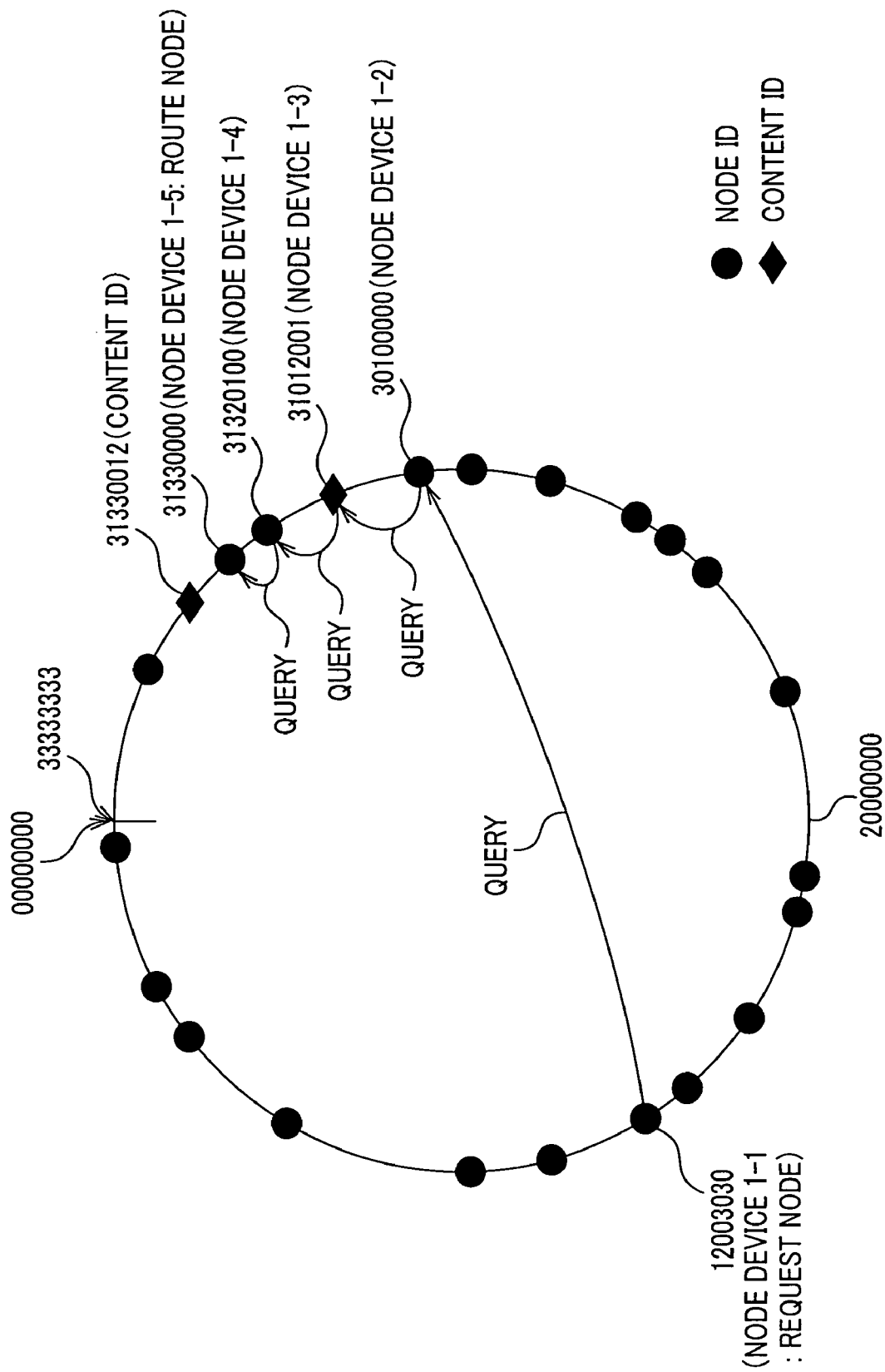
FIG. 13 shows an example where the node device 1 which saves content data is searched by DHT.

FIG. 13 is a view showing an example in which a node device 1 which saves content data is searched by a DHT.

Here, a procedure by which a node device 1-1 having a node ID of "12003030" (hereinafter referred to as "request node") searches for content data having a content ID of "31330012" will be explained.

The request node refers to a table of level 1 of a routing table that the request node retains and transmits content inquiry information (hereinafter, "content inquiry information" will be referred to as "query") to a node device having a node ID of the same area as content ID "31330012". That is, since the content ID "31330012" is in an area of "3XXXXXXX", a query is transmitted to a node device 1-2, having a node ID "30100000" of which IP address is known to the request node (that is, the IP address has been saved in a routing table retained by the request node), among node devices 1 included in the "3XXXXXXX" area.

According to the example shown in FIG. 13, since the IP address of the node device 1-2 has been saved in a routing table of the request node, the request node transmits a query to the node device 1-2 of which node ID is "30100000".

Next, the node device 1-2 which received the query refers to a table of level w retained by the node device 1-2 and transmits the query to a node device 1-3, of which IP address is known to the node device 1-2 (node ID "31012001"), among node devices 1 belonging to an area of "31XXXXXX".

Thus, transfer of the query proceeds by matching digit of content ID from the top and finally the query reaches a node device 1-5 which manages the content data, which is a route node. Then, the route node searches for content ID "31330012" included in the query from index information managed by the route node and replies an IP address or the like of a node device 1 which has the content data to the request node.

Thus, the request node (node device 1-1) receives location of content data of which content ID is "31330012", that is, an IP address of a node device 1 which saves the content data, from the route node (node device 1-5) and obtains (downloads) the content data from the node device 1 which saves the content data.

Note that registration method of content data is similar to the method explained in detail in the above-mentioned [1-4. Registration method of content data] in the first embodiment. However, in the present embodiment, a node device in the middle of a route to the route device also has a cache node which retains index information saved by the route node as cache. Thus, before the route node receives the query, at the point of time when the query has been transferred to the cache node device, the cache node can reply to the request node which inquired an IP address of a content node, that is, location of content, more quickly.

Moreover, configuration of the node device is similar to the one explained in the above mentioned [2. Configuration of node device and the like] in the first embodiment. However, in the present embodiment, when various programs saved in the storage part 12 are performed by the CPU in the control part 11, the request node as the first node device, the cache node as the second node device, the route node as the second node device and management node device, and whole of the node devices 1 as content device which serve as information saving node device are controlled as a whole and when a node device 1 functions as a request node, the control part 11 functions as identification information transmission means, while when a node device 1 functions as a cache node or a route node, the control part 11 functions as saving means, node information search means, identification information transfer means, judgment means, update means, error reply means, and update instruction information transmission means.

[4. Operation of Content Delivery System]

Next, with reference to FIGS. 14 to 18, operation of content delivery system S according to the present embodiment will be explained.

[4-1 Overall Operation of Content Delivery System]

First, overall operation of the content delivery system is explained with an example.

Figure 14:
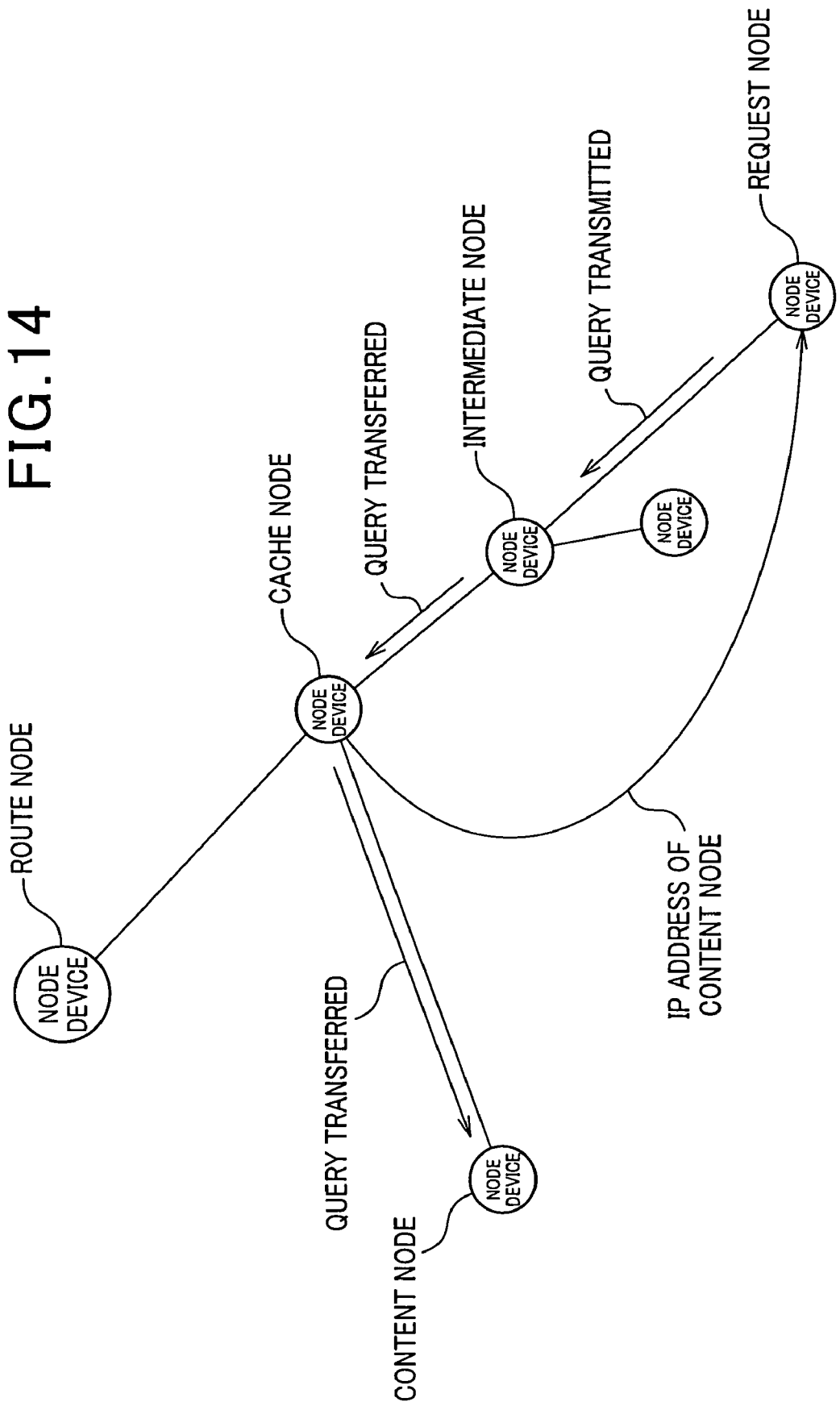
FIG. 14 is a graphical illustration in which transmission and receiving of various information such as a query between a request node, a content node, a route node, and a cache node is expressed as a spanning tree.

FIG. 14 is a graphical illustration in which transmission and receiving of various information such as a query, which are performed when a request node requests content delivery, between the request node, a content node, a route node, and a cache node are expressed as a spanning tree (in the figure, an intermediate node is a node which does not have an index cache effective to a target content and a cache node is a node having the index cache).

Figure 15:
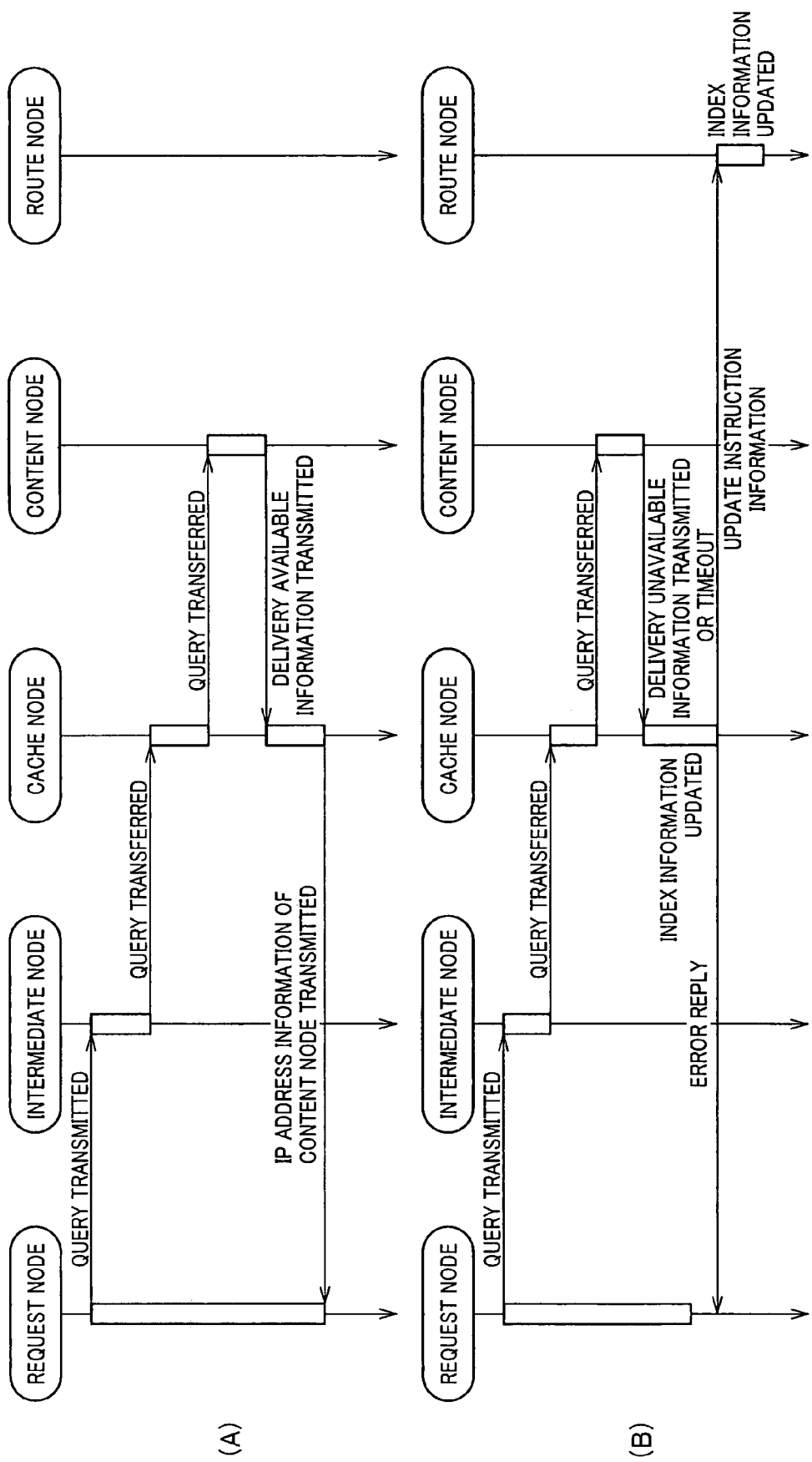
FIG. 15A is a sequence chart showing content which exists in a content node in a deliverable state. (B) A sequence chart showing a condition where content does not exist in a content node in a deliverable state, or where the content node itself is not operating for a certain reason.

FIG. 15 is a sequence chart between a request node, a content node, a route node, an intermediate node on a route, and a cache node when the request node confirms location of the content node retaining desired content data. FIG. 15 (A) is a sequence chart when content, being available for delivery, exists in a content node and FIG. 15 (B) is a sequence chart when content, not being available for delivery, exists, or the content node itself does not work due to a certain reason (such as when power is off).

In the present embodiment, when the request node transmits an inquiry (query) to confirm the location of the content node, survival confirmation of the content node or confirmation whether the content exists in the content node in a condition where delivery thereof is available or not is performed and, as a result, when the content cannot be delivered, the cache node or the route node performs update of index information retained by the cache node or the route node.

First, a case where the content node is found by the cache node when the content exists in the content node and is available for delivery is explained with reference to FIGS. 14 and 15 (A).

At first, when the request node transmits the query to the intermediate node, the intermediate node which received the query searches for a content ID included in the query from index information managed by the intermediate node. When it is judged that there is no content ID in the index information, the intermediate node transfers the query to a node device which is closer to the route node. According to an example shown in FIG. 14, the query is transferred to the cache node.

Subsequently, the cache node which received the query searches for the content ID included in the query, similarly to the above, from index information managed by the cache node and when cache node succeeds in the search, the query is transferred to the content node. FIG. 16 shows an example of index information saved in the storage part 12 of the cache node.

Then, the cache node receives delivery available information, which means that the content data can be delivered from the content node to the request node, from the content node and, thereafter, transmits an IP address of the content node to the request node. According to the example shown in FIG. 16, when the content ID as identification information included in the query is "300010121", an IP address "121.43.154.65" as node information of the content node corresponding thereto is searched and the IP address is replied to the request node as IP address information.

Thus, the request node receives the IP address of the content node from the cache node and comes to know the location of desired content data, that is, existence of the content node which saves the data, and accesses the content node to obtain (download) the content data.

Next, by use of FIG. 15 (B), a case where a content node has been found by the cache node, yet the content does not exist in the content node, or the content node itself is not working doe to a certain reason will be explained.

First, similarly to the above, when a query is transmitted to an intermediate node, the intermediate node receives the query, searches for a content ID included in the query from index information managed by the intermediate node, and after a judgment that the content ID does not exist in the index information, the query is transferred to a node device closer to the route node. According to the example shown in FIG. 14, the query is transferred to the cache node.

Subsequently, the cache node which received the query searches for the content ID included in the query, similarly to the above. Since the search is succeeded here, the query is transferred to the content node.

At this point of time, the cache node begins to measure time and when there is no response from the content node within a predetermined response waiting time (timeout), or when the delivery unavailable information which means that the content data cannot be delivered to the request node is received from the content node, the cache node updates index information saved by the storage part 12 of the cache node. Specifically, when the content ID included in the query is "30001012", information regarding the content (such as an IP address "121.43.154.65" of the content node or the title "O!★") is deleted from the index information.

Then the cache node transmits information instructing deletion of information of which content ID is "30001012" as update instruction information toward the route node. Thus, the route node or another cache node existing between the route node and the cache node (though not shown as another cache node in FIG. 14) deletes information regarding the content of which content ID is "30001012" from the index information saved in the storage part 12 of the route node itself on the basis of the update instruction information thus received to update the index information. On the other hand, the cache node transmits an error reply indicating that the content node is down to the request node.

[4-2. Operation by Each Node]

Next, processing performed by each node when the request node performs delivery request will be explained. As described above, all the node devices 1 included in the content delivery system S can be any of a request node, a cache node, a route node, a content node, an intermediate node on a route, or other node.

For example, when a user operates the input part 21 provided to a node device 1 and inquiry regarding location of desired content data as specific common information is instructed, the node device 1 functions as a request node as a first node device. Moreover, a node device 1 which received a query from the request node and is inquired about location of the content data functions as a route node when information of the content exists in index information saved in the storage part 12 of the node device 1, while the same node device 1 functions as a content node when the node device 1 itself retains the content.

Figure 17:
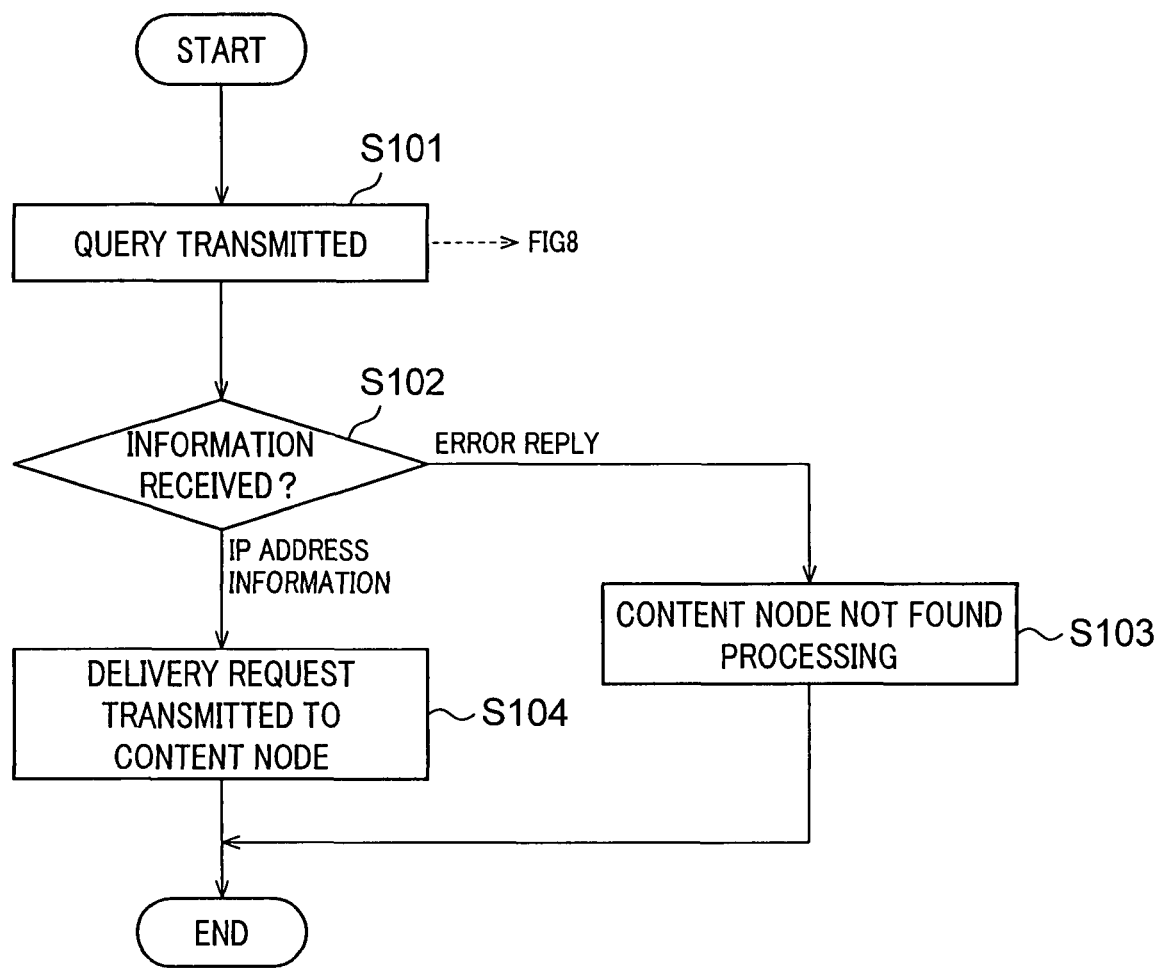
FIG. 17 is a flow chart showing processing in the control part 11 in a request node.
Figure 18:
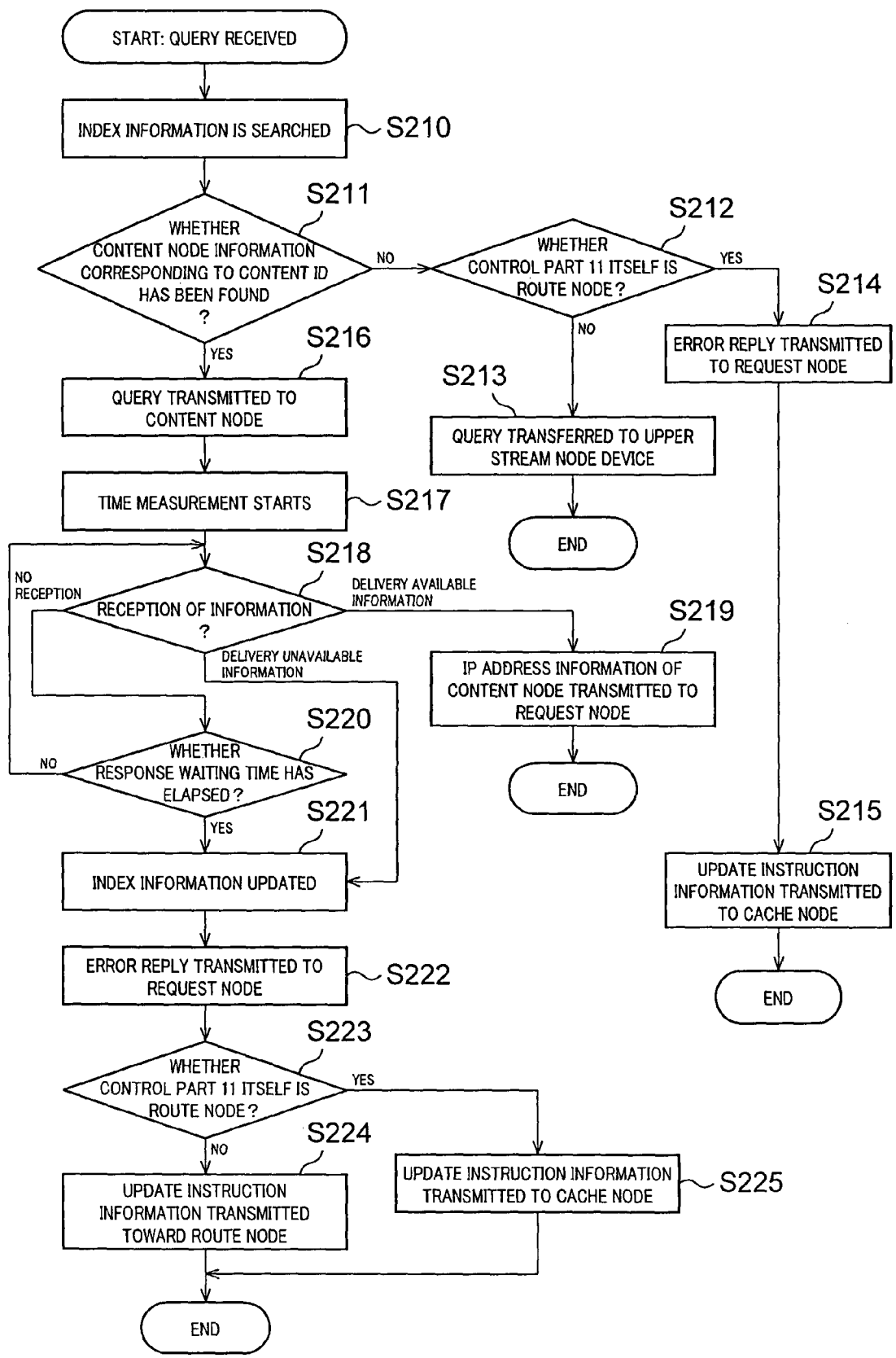
FIG. 18 is a flow chart showing information update processing in the control part 11 in a cache node or a route node.

Hereafter, processing performed by a node device when the node device 1 functions as each of the nodes will be explained in detail using FIGS. 17 and 18.

[4-2-1. Processing by Request Node]

First, using FIG. 17, processing by a request node will be explained. FIG. 17 is a flow chart showing a program saved in the control part 11 of a request node being performed by the control part 11.

When a user operates the input part 21 and inputs title of the content or the like to inquire location of desired content data, the request node hashes title of the content or the like to generate content ID indicating the content data (unique identification information corresponding to specific common information) and, at the same time, transmits a query including the content ID thus generated to other node device 1 while referring to a routing table saved in the storage part 12 (Step S101). Selection method of the other node device 1 follows the method explained in detail in [1-3. Search method of content data].

Then, when the request node receives IP address information of a content node from a route node or a cache node (Step S102: IP address information), the request node requests delivery to the content node which is identified by the IP address information (Step S104) and finishes the processing.

On the other hand, when the request node receives an error reply from the route node or the cache node (Step S102: error reply), the request node performs desired content node could not be found processing such as displaying a message "Specified content could not be found" or the like on the display part 16 (Step S104) and finishes the processing.

[4-2-2. Processing by Cache Node and Route Node]

Next, using FIG. 18, processing by a cache node and a route node will be explained. FIG. 18 is a flow chart showing processing which is performed when a control part 11 of a cache node or a route node performs an information update program saved in the control part 11.

The processing begins when a request node or other node transmits a query.

First, the control part 11 functions as node information search means, refers to index information saved in a storage part 12 of the control part 11 based on a content ID included in the received query and searches for information of a content node (node information) corresponding to the content ID (Step S210).

Next, whether information regarding a content node corresponding to the content ID has been found or not is judged (Step S211). When not found (Step S211: No), it is judged whether the control part 11 itself is a route node or not (Step S212) and when the control part 11 is not a route node (Step S212: Yes), the query is transferred to an upper stream node device (Step S213) and the processing is finished.

On the other hand, when it is judged that the control part 11 is a route node in the judgment in Step S212 (Step S212: No), an error reply is transmitted to the request node (Step S214). Then, the control part 11 functions as update instruction information transmission means to transmit update instruction information which instructs to delete content information indicated by the content ID included in the query (content IP address or index information such as various auxiliary information) to all the cache nodes in the content delivery system S(Step S215) and finishes the processing.

Moreover, when information regarding a content node corresponding to the content ID has been found in the processing in Step S211 (Step S211: Yes), the control part 11 functions as identification information transfer means to transfer the query to the content node (Step S216).

Subsequently, the control part 11 functions as time measurement means and begins to measure time using a built-in clock or the like provided in the device (Step S217).

Then, when certain information is received from the content node (Step S218), when the received information is delivery available information (Step S218: delivery available information), IP address information indicating an IP address of the content node is transmitted to the request node (Step S219) and the processing is finished.

Meanwhile, when the information received in Step S218 is delivery unavailable information (Step S218: delivery unavailable information), the processing proceeds to Step S221. When no information regarding availability of delivery has been received in Step S218, the processing proceeds to Step S220.

Then, it is judged whether a predetermined period of time (for example, 10 seconds) has elapsed or not in Step S220 and when the time has elapsed (Step S220: Yes), the processing proceeds to Step S221 and when the time has not elapsed (Step S220: No), the processing proceeds to Step S218 and waits for reception of information.

In other words, in Steps S218 and S220, the control part 11 functions as judgment means.

Subsequently, when delivery unavailable information has been received in Step S218 or when no reply has been received after reply waiting time has elapsed (time out, Step S220: Yes), the control part 11 functions as update means and updates index information saved in the storage part 12 (Step S221). More specifically, content information indicated by the content ID included in the query (content node IP address, various auxiliary information, or the like).

Next, the control part 11 functions as error reply means and transmits an error reply to the request node (Step S222).

Then, it is judged whether the control part 11 itself is a route node or not (Step S223) and when the control part 11 is not a route node (Step S233: No), the control part 11 functions as update instruction information transmission means, transmits update instruction information which instruct to update index information to an upper stream node device (Step S224) and finishes processing. On the other hand, when the control part 11 is a route node (Step S223: Yes), the control part 11 functions as update instruction information transmission means, transmits the update instruction information to all the cache nodes in the content delivery system S (Step S225) and finishes the processing.

Actually, because survival status of content nodes is always confirmed by a lower stream cache node, such a case where a route node knows invalidity (confirm survival status of content nodes) earlier is assumed to be rare. However, for example, when the route node itself becomes a request node to inquire about location of a content node at a different point of time, it can be assumed that the route node knows the survival status of content nodes first. In such a case, the route node performs update instruction to the cache node. Note that for the route node to know an IP address of a lower stream cache node, it can be realized when an IP address of a sender of a message is saved by each cache node (reverse link of a spanning tree shown in FIG. 14 is saved) in the process in which an open message is transferred from a content holder to a route node via a cache node when content data is registered (refer to [1-4. Registration method of content data]).

Moreover, when the content node is restored again, following a method in [1-4. Registration method of content data] in the first embodiment, the content node transmits the open message to a route node to update (register content information) index information saved in the storage part 12 of the cache node and the route node.

As explained above, according to the present embodiment, when inquiry of location of content data is performed by a request node, a cache node or a route node can update index information retained by each node. Therefore, when content data receives more inquiry about location (request), it becomes possible for a route node or a cache node which manages the content data to retain latest information regarding the content data.

Moreover, regarding content data which receives less inquiry about location (request), it becomes unnecessary for a route node or a cache node to frequently manage and update survival information regarding the content data. Therefore, it is possible to reduce update const of index information. Thus, it is possible to manage/update content based on the frequency of access.

In addition, this can be applied when a plurality of content nodes having one and same arbitrary content exist in the information delivery system S.

Furthermore, when either of a route node or a cache node which manages content data recognizes that a content node retaining the content data is down or content data is not available for delivery, not only index information of the route node or cache node is updated but also update instruction information which instructs update to other route node or cache node is transmitted. Therefore, management information of content data can be quickly shared.

The present invention is not confined to the configuration listed in the foregoing embodiments, but it is easily understood that the person skilled in the art can modify such configurations into various other modes, within the scope of the present invention described in the claims.

What is claimed is:

1. An information delivery system comprising:
a plurality of node devices which are connected each other via a network, the plurality of node devices comprising at least a first node device, a second node device and information saving node devices that save specific common information to be shared among the plurality of node devices, wherein:
the first node device comprises:
an identification information transmission unit for transmitting unique identification information corresponding to the specific common information to the second node device;
an information receiving unit for receiving an information indicating a state of delivery or communication regarding the information saving node devices from the information saving node devices; and
a delivery request unit configured to request delivery of the specific common information to a selected one of the information saving node devices, wherein the selected information saving node device is selected from the information saving node devices which send the information regarding the information saving node devices to the first node device on the basis of the received information;
the second node device comprises:
a saving unit for saving the identification information corresponding to the specific common information and node information indicative of a location on the network of at least one of the information saving node devices, by associating the identification information with the node information;

a node information search unit configured to search for the node information that corresponds to the received identification information upon receipt of the identification information;

an identification information transfer unit for transferring the identification information to at least one of the information saving node devices, which are indicated by the node information indicative of a location on the network, in response to judging there is the node information corresponding to the received identification information in the saving unit; and an error reply unit for sending a reply which indicates that there is no specific common information to the first node device, in response to judging that the saving unit does not have node information corresponding to the identification information and the second node device itself is a management node device which manages the specific common information;

the information saving node device comprises:

a delivery unit for delivering the specific common information to the first node device which sent delivery request upon receipt of delivery request for the specific common information from the first node device, a judgment unit configured to judge whether or not transmission of the specific common information, indicated by the received identification information can be transmitted to the first node device which sent the identification information, upon receipt of the identification information from one of the second node devices;

an information transmission unit, in response to being judged that the transmission is available by the judgment unit, for transmitting the information regarding at least one of the information saving node devices to the first node device which sent the identification information; and a judgment information reply unit for sending available information to the second node device in response to being judged with the judgment unit that delivery is available, and sending unavailable information to the second node device in response to being judged delivery is unavailable, wherein the identification information transfer unit transfers, in response to judging the second node device itself is not the management node device and receiving the unavailable information, the identification information to a node device intervening between the second node device and the management node device, or transfers to the management node device in response to judging there is no node device intervening between the second node device and the management node device, the error reply unit sends, in response to judging the second node device itself is the management node device, a reply that there is no specific common information to the first node device, and the identification information includes request number information indicative of a requested number of the information regarding at least one of the information saving node devices; and the second node device further comprises:

an update unit for updating the requested number by subtracting the number of the received available information from the requested number, and wherein the identification information transfer unit transfers the identification information to a node device intervening between the second node device and the management node device, or to the management node device in response to judging there is no node device therebetween, and the identification information transfer unit incorporates the updated request number into the identification information in response to judging the request number is one or more.

2. The information delivery system according to claim 1, wherein in response to judging there is no node information which corresponds to the received identification information in the saving unit and the second node device itself is not a management node device, which manages the specific common information, the identification information transfer unit in the second node device transfers the received identification information to a node device intervening between the second node device and the management node device, or to the management node device in response to judging there is no node device intervening between the second node device and the management node device.

3. The information delivery system according to claim 1, wherein the second node device comprises a waiting time setting unit configured to set a waiting time for receiving the judgment information from the information saving node device; and wherein the identification information transfer unit and the error reply unit judge that the unavailable information is received from at least one of the information saving devices, in response to judging there is no reply of the judgment information from the information saving node device after the waiting time elapses.

4. The information delivery system according to claim 1, wherein the information regarding the information saving node devices includes communication load information regarding load in communication routes in the network, and the delivery request unit in the first node device, in response to judging the information regarding the information saving node devices is received from at least one of the information saving node devices, compares communication load based on the communication load information and selects the information saving node device connected via a communication route having a relatively small communication load, wherein the delivery request unit requests delivery of the specific common information to the selected information saving node information saving node device.

5. The information delivery system according to claim 4, wherein the communication load information is in a time to live (TTL) field inside an IP packet.

6. An information delivery system including a plurality of node devices connected with each other via a network, the plurality of node devices comprising at least a first node device, a second node device and information saving node devices that save specific common information to be shared among the plurality of node devices, wherein the each first node device comprises:

an identification information transmission unit for transmitting unique identification information corresponding to the specific common information to the second node device;

an information receiving unit for receiving the information regarding the information saving node devices from the information saving node devices; and a delivery request unit configured to request delivery of the specific common information to a selected one of the information saving node devices, wherein the selected information saving node device is selected from the information saving node devices which send the information regarding the information saving node devices to the first node device on the basis of the received information, wherein the second node device comprises:
- a saving unit for saving the identification information corresponding to the specific common information and node information indicative of a location on the network of at least one of the information saving node devices by associating the identification information with the node information;
- a node information search unit configured to search for the node information that corresponds to the received identification information upon receipt of the identification information;
- an identification information transfer unit for transferring the identification information to at least one of the information saving node devices, which are indicated by the node information indicative of a location on the network, in response to judging there is the node information corresponding to the received identification information in the saving unit; and
- an error reply unit for sending a reply which indicates that there is no specific common information to the first node device, in response to judging that the saving unit does not have node information corresponding to the identification information and the second node device itself is a management node device which manages the specific common information;

the information saving node device comprises:
- a delivery unit for delivering the specific common information to the first node device which sent delivery request upon receipt of delivery request for the specific common information from the first node device;
- a judgment unit configured to judge whether or not transmission of the specific common information, indicated by the received identification information can be transmitted to the first node device which sent the identification information, upon receipt of the identification information from one of the second node devices;
- an information transmission unit, in response to being judged that the transmission is available by the judgment unit, for transmitting the information regarding at least one of the information saving node devices to the first node device which sent the identification information; and
- a judgment information reply unit for sending available information to the second node device in response to being judged with the judgment unit that delivery is available, and sending unavailable information to the second node device in response to being judged delivery is unavailable, wherein the identification information transfer unit transfers, in response to judging the second node device itself is not the management node device and receiving the unavailable information, the identification information to a node device intervening between the second node device and the management node device, or transfers to the management node device in response to judging there is no node device intervening between the second node device and the management node device, the error reply unit sends, in response to judging the second node device itself is the management node device, a reply that there is no specific common information to the first node device, and the identification information includes request number information indicative of a requested number of the information regarding at least one of the information saving node devices; and the second node device further comprises;
- an update unit for updating the requested number by subtracting the number of the received available information from the requested number, and
- the identification information transfer unit transfers the identification information to a node device intervening between the second node device and the management node device, or to the management node device in response to judging there is no node device therebetween,
- wherein the identification information transfer unit incorporates the updated request number into the identification information in response to judging the request number is one or more.

7. The information delivery system according to claim 6, wherein the information regarding at least one of the information saving node devices has communication load information regarding load in a communication route of the network, and the delivery request unit, in response to judging the information regarding the information saving node devices is received from the plurality of the information saving node devices, compares communication load on the basis of the communication load information, and selects the information saving node device connected via the communication route having relatively small communication load, wherein the delivery request unit requests delivery of the specific common information to the selected information saving node device.

8. The information delivery system according to claim 7, wherein the communication load information is in a time to live (TTL) field inside an IP packet.

9. An information delivery system including a plurality of node devices connected each other via a network, the plurality of node devices comprising at least a first node device that sends-identification information, wherein by sending the identification information the first node device is requesting information indicating a state of delivery or communication regarding at least one of information saving node devices, the second node device that receives the identification information from the first node device and the information saving node devices that save specific common information to be shared among the plurality of node devices, wherein the second node device comprises:

- a saving unit for saving the identification information corresponding to the specific common information and node information indicative of a location on the network of the information saving node devices, by associating the identification information with the node information;
- a node information search unit configured to search for the node information corresponding to the received identification information upon receipt of the identification information;
- an identification information transfer unit for transferring the identification information in response to judging there is the node information corresponding to the identification information in the saving unit, wherein by transferring the identification information the second node device is requesting the information saving node devices that the information saving node devices transmit the information indicating a state of delivery or communication regarding the information saving node devices to the first node device that sent the identification information, and an error reply unit for sending a reply that the specific common information does not exist to the first node device, in response to judging that the saving unit does not have node information corresponding to the identification information and the second node device itself is a management node device which manages the specific common information, wherein:

the identification information transfer unit transfers, in response to judging the second node device itself is not the management node device and receiving unavailable information indicative of an issue that delivery is unavailable as judgment information indicative of availability of delivery of the specific common information form at least one of the information saving node devices, the identification information to a node device intervening between the second node device and the management node device, or transfers to the management node device in response to judging there is no node device intervening therebetween;

the error reply unit sends, in response to judging the second node device itself is the management node device, a reply that the specific common information does not exist to the first node device, and the identification information has request number information indicative of a request number of the information regarding at least one of information saving node devices, and the second node device further comprising;

an update unit for updating the request number by subtracting a number of the received available information from the request number, wherein the identification information transfer unit includes the updated request number only in response to judging the request number is one or more, and the identification information is transferred to the node device intervening between the second node device and the management node device, or to the management node device in response to judging there is no node device intervening therebetween.

10. The information delivery system according to claim 9, wherein in response to judging there is no node information corresponding to the received identification information and simultaneously the second node device itself is not the management node device, the identification information transfer unit transfers the received identification information to a node device intervened between the second node device and the management node device or to the management node device in response to judging there is no node device intervening between the second node device and the management node device.

11. The information delivery system according to claim 9, wherein the second node device has a waiting time setting unit for setting a waiting time for receiving the judgment information from at least one of the information saving node devices, and wherein the identification information transfer unit and the error reply unit judge that the unavailable information is received from at least one of the information saving devices, in response to judging there is no reply of the judgment information from the information saving node device which does not provide a reply of the judgment information after the waiting time elapses.

12. A non-transitory computer-readable storage medium that stores a computer-executable program for an information delivery system including a plurality of node devices connected each other via a network, the plurality of node devices comprising at least a first node device, a second node device and information saving node devices that save specific common information to be shared among the plurality of node devices, the program being installed in the first node device, to perform steps comprising:

transmitting unique identification information corresponding to the specific common information to the second node device;

receiving the information indicating a state of delivery or communication regarding the information saving node devices from the information saving node devices; and requesting delivery of the specific common information to a selected one of the information saving node devices, wherein the selected information saving node device is selected from the information saving node devices which send the information indicating a state of delivery or communication regarding the information saving node devices to the first node device on the basis of the received information, wherein the second node device comprises:

a saving unit for saving the identification information corresponding to the specific common information and node information indicative of a location on the network of at least one of the information saving node devices by associating the identification information with the node information;

a node information search unit configured to search for the node information that corresponds to the received identification information upon receipt of the identification information;

an identification information transfer unit for transferring the identification information to at least one of the information saving node devices, which are indicated by the node information indicative of a location on the network, in response to judging there is the node information corresponding to the received identification information in the saving unit; and an error reply unit for sending a reply which indicates that there is no specific common information to the first node device, in response to judging that the saving unit does not have node information corresponding to the identification information and the second node device itself is a management node device which manages the specific common information, the information saving node device comprises;

a delivery unit for delivering the specific common information to the first node device which sent delivery request upon receipt of delivery request for the specific common information from the first node device;

a judgment unit configured to judge whether or not transmission of the specific common information, indicated by the received identification information can be transmitted to the first node device which sent the identification information, upon receipt of the identification information from one of the second node devices;

an information transmission unit, in response to being judged that the transmission is available by the judgment unit, for transmitting the information regarding at least one of the information saving node devices to the first node device which sent the identification information; and a judgment information reply unit for sending available information to the second node device in response to being judged with the judgment unit that delivery is available, and sending unavailable information to the second node device in response to being judged delivery is unavailable, wherein he identification information transfer unit transfers, in response to judging the second node device itself is not the management node device and receiving the unavailable information, the identification information to a node device intervening between the second node device and the management node device, or transfers to the management node device in response to judging there is no node device intervening between the second node device and the management node device, the error reply unit sends, in response to judging the second node device itself is the management node device, a reply that there is no specific common information to the first node device, and the identification information includes request number information indicative of a requested number of the information regarding at least one of the information saving node devices; and the second node device further comprises;
an update unit for updating the requested number by subtracting the number of the received available information from the requested number, and the identification information transfer unit transfers the identification information to a node device intervening between the second node device and the management node device, or to the management node device in response to judging there is no node device therebetween, wherein the identification information transfer unit incorporates the updated request number into the identification information in response to judging the request number is one or more.

13. The non-transitory computer-readable storage medium according to claim 12, wherein the information regarding the information saving node devices includes communication load information regarding load in a communication route on the network; and the steps further comprises:
comparing communication load based on the communication load information in response to judging the information regarding the information saving node devices is received from the plurality of the information saving devices;

selecting the information saving node device connected via the communication route having relatively small communication load; and requesting delivery of the specific common information to the selected information saving node device.

14. The non-transitory computer-readable storage medium according to claim 13, wherein the communication load information is in a time to live (TTL) field inside an IP packet.

15. A non-transitory computer-readable storage medium that stores a computer-executable program for an information delivery system including a plurality of node devices connected each other via a network, the plurality of node devices comprising at least a first node device that sends identification information corresponding to specific common information to be shared among the plurality of node devices, the second node device that receives the identification information from the first node device and information saving node devices that save the specific common information, the program being installed in each second node device, to perform steps comprising:

saving the identification information corresponding to the specific common information and node information indicative of a location on the network of the information saving node devices, by associating the identification information with the node information;

searching for the node information corresponding to the received identification information upon receipt of the identification information and request for the specific common information;

transferring the received identification information to the information saving node devices indicative of the node information in response to judging there is the node information corresponding to the received identification information, sending a reply that there is no specific common information to the first node device, in response to judging that there is no node information corresponding to the received identification information and the second node device itself is not a management node device, which manages the specific common information;

receiving judgment information indicative of whether or not the specific common information can be transmitted from the information saving node devices;

transferring, in response to judging unavailable information indicative of an event that transmission is not available is received and judging the second node device itself is not the management node device, the identification information to the node device intervening between the second node device and a management node device which manages the specific common information, or transferring to the management node device in response to judging there is no node device intervening therebetween; and sending, in response to judging the second node device itself is the management node device, a reply that the specific common information does not exist to the firs node device, wherein the identification information includes request number information indicative of a request number of the information regarding the information saving node devices, and the steps further comprises;
updating the request number by subtracting the number of available information received from the information saving node device from the request number; and transferring the identification information having the request number information thus updated as a new request information containing in it, to a node device intervening between the second node device and the management node device in response to judging the request number is one or more, or to transfer to the management node device in response to judging there is no node device intervening therebetween.

16. The non-transitory computer-readable storage medium according to claim 15, the steps further comprises:

transferring, in response to judging there is no node information corresponding to the received identification information and the second node device itself is not a management node device which manages the specific common information, the received identification information to a node device intervening between the second node device and the management node device, which manages the specific common information, or to the management node device in response to judging there is no node device intervening between the second node device and the management node device.

17. The non-transitory computer-readable storage medium according to claim 15, the steps further comprises:
setting a waiting time in receiving the judgment information from at least one of the information saving node devices; and
judging that the unavailable information is received from at least one of the information saving node devices, which does not provide a reply of the judgment information after the waiting time is elapsed.

18. An information delivery system having a plurality of node devices which are connected each other via a network, the plurality of node devices comprising at least a first node device, a second node device and information saving node devices that save specific common information to be shared among the plurality of node devices, wherein:
the first node device comprises an identification information transmission unit for transmitting unique identification information corresponding to the specific common information to the second node device; and
the second node device comprises:
a saving unit for saving the identification information corresponding to the specific common information and the node information indicative of a location on the network of at least one of the information saving node devices, by associating the identification information with the node information;
a node information search unit configured to search the node information corresponding to the received identification information in response to judging the identification information is received;
an identification information transfer unit for transferring the identification information to at least one of the information saving node devices indicated by the node information in response to judging there is node information corresponding to the identification information;
a judgment unit for judging whether or not transmission of the specific common information is available; and
an update unit for updating information saved in the saving unit in response to judging it is judged that transmission of the specific common information from at least one of the information saving node devices is not available,
wherein the identification information includes the number of information that the first node device requests.

19. The information delivery system according to claim 18, further comprising:
a time measuring unit for measuring a time in response to judging the identification information is transferred,
wherein the judgment unit judges that transmission of the specific common information is not available in response to judging there is no response from the information saving node device within a predetermined reply waiting time or in response to judging the judgment unit receives unavailable information indicative of transmission of the specific common information from at least one of the information saving node devices is not available.

20. The information delivery system according to claim 18, wherein the second node device has an error reply unit for replying to the first node device an event that there is no specific common information in response to judging it is judged by the judgment unit that transmission of the specific information by at least one of the information saving node devices is not available.

21. The information delivery system according to claim 18, wherein the second node device has an update instruction information transmission unit for transmitting update instruction information for instructing update with respect to other node devices, which are included in the plurality of node devices and have the saving unit for saving the identification information corresponding to the specific common information and node information indicative of the information saving node device which saves the specific common information in response to judging information is updated with the update unit.

22. The information delivery system according to claim 21 wherein the update unit updates information saved in the saving unit according to the update instruction information in response to judging the update instruction information is received from any of the plurality of node devices.

23. An information delivery system including a plurality of node devices connected each other via a network, the plurality of node devices comprising at least a first node device that sends identification information, a second node device that receives the identification information from the first node devices and information saving node devices that save specific common information to be shared among the plurality of node devices, wherein the second node device comprises:
a saving unit for saving unique identification information corresponding to the common information and node information indicative of a location on the network of the information saving node devices, by associating the identification information with the node information;
a node information search unit configured to search the node information corresponding to the received identification information in response to judging the identification information is received;
an identification information transfer unit for transferring the received identification information, to at least one of the information saving node devices indicated by the node information in response to judging there is node information corresponding to the received identification information;
a judgment unit for judging availability of delivery of the specific common information with the information saving node device; and
an update unit for updating information saved in the saving unit in response to judging it is judged that delivery of the specific common information from at least one of the information saving node devices is not available,
wherein the identification information includes the number of information that the first node device requests.

24. The second node device according to claim 23, further comprising:
a time measuring unit for measuring a time in response to judging the identification information is transferred,
wherein the judgment unit judges that transmission of the specific common information with the information node device is not available in response to judging there is no response from at least one of the information saving node devices within a predetermined response waiting time or the judgment unit receives unavailable information indicative of an event that transmission of the specific common information from at least one of the information saving node devices is not available.

25. The second node device according to claim 23, further comprising:
an error reply unit for sending a reply which indicates that there is no specific common information to the first node device in response to being judged that the information saving node device cannot transmit the specific common information.

26. The second node device according to claim 23, further comprising:
an update instruction information transmission unit for transmitting update instruction information of instructing update, to other node devices which have the saving unit for saving the identification information corresponding to the specific common information and node information indicative of at least one of the information saving node devices, which saves the specific common information in response to judging the update unit updates the information.

27. The second node device according to claim 26, wherein the update unit updates information saved in the saving unit in accordance with the update instruction information in response to judging the update instruction information is received from any one of the plurality of node devices.

28. A non-transitory computer-readable storage medium that stores a computer-executable program for an information delivery system including a plurality of node devices connected each other via a network, the plurality of node devices comprising at least a first node device that sends identification information, a second node device that receives the identification information from the first node device and information saving node devices that save specific common information to be shared among the plurality of node devices, the program being installed in the second node device, to perform steps comprising:
saving unique identification information corresponding to the common information and the node information indicative of a location on the network of at least one of the information saving node devices, by associating the identification information with the node information;
searching the node information corresponding to the received identification information in response to judging identification information is received;
transferring the received identification information to at least one of the information saving node devices indicated by the node information in response to judging there is node information corresponding to the received identification information in the saving unit;
judging availability of delivery of the specific common information with at least one of the information saving node devices; and
updating information saved in the second node device in response to judging it is judged that the information saving node device cannot transmit the specific common information; and
transmitting update instructions to other node devices which save the identification information and the node information, in response to judging the information in the second node device is updated, so that other node devices update their information,
wherein the identification information includes the number of information that the first node device requests.

29. The non-transitory computer-readable storage medium according to claim 28, the steps further comprises:
starting to measure a time in response to judging the identification information is transferred, and
judging that at least one of the information saving node devices cannot send the specific common information in response to judging there is no response from at least one of the information saving node devices within a predetermined response waiting time or when unavailable information indicative of an event that at least one of the information saving node devices cannot transmit the specific common information.

30. The non-transitory computer-readable storage medium according to claim 28, the steps further comprises:
sending a reply to the first node device in response to judging it is judged that the information saving node device cannot transmit the specific common information.

31. The non-transitory computer-readable storage medium according to claim 28, the steps further comprises:
transmitting update instruction information which instructs to update with respect to the other node devices having the saving unit for saving the identification information corresponding to the specific common information and the node information indicative of a location on the network of at least one of the information saving node devices for saving the specific common information in response to judging the information is updated with the update unit.

32. The non-transitory computer-readable storage medium according to claim 31, the steps further comprises:
updating information, saved in the saving unit in accordance with the update instruction information in response to judging the update unit receives the update instruction information from any one of the plurality of the node devices.

33. A non-transitory information recording medium having the information update program according to claim 28 recorded on it.

34. An information update method in an information delivery system including a plurality of node devices, which are connected each other via a network, the plurality of node devices comprising at least a first node device, a second node device and information saving devices that save specific common information to be shared among the plurality of node devices, the method the steps of:
transmitting identification information that corresponds to the specific common information-from the first node device to the second node device;
saving the identification information and the node information indicative of a location on the network of the information saving node devices, by associating the identification information with the node information, in the second node device;
searching the node information corresponding to the received identification information in response to judging the identification information is received, the searching being conducted in the second node device;
transferring the identification information from the second node device to the information saving node device indicated by the node information, in response to judging there is node information corresponding to the received identification information;
judging whether or not transmission of the specific common information from the information saving node devices is available or not, the judging being conducted in the second node device; and
updating the information saved in the second node device in response to judging transmission of the specific common information from at least one of the information saving node devices is not available,
wherein the identification information includes the number of information that the first node device requests.

35. The information update method according to claim 34, further comprising the steps of:

starting to measure a time in response to judging the identification information is transferred, in the second node device; and judging that at least one of the information saving node devices cannot transmit the specific common information in response to judging there is no response from at least one of the information saving node devices within a predetermined response waiting time or unavailable information indicative of an event that at least one of the information saving node devices cannot transmit the specific common information is received.

36. The information update method according to claim 34, further comprising the step of:

sending a reply to the first node device that there is no specific common information in response to being judged that at least one of the information saving node devices cannot transmit the specific common information.

37. The information update method according claim 34, further comprising the steps of:

making the second node device transmit update instruction information, which instructs to update with respect to other node devices, which are included in the plurality of node devices; and saving the identification information corresponding to the specific common information and the node information indicative of at least one of the information saving node devices, which saves the specific common information in response to judging information is updated in the second node device.

38. The information update method according to claim 37, wherein the saved information is updated in accordance with the update instruction information in response to judging the update instruction information is received from any one of the plurality of node devices.

\* \* \* \* \*

UNITED STATES PATENT AND TRADEMARK OFFICE
CERTIFICATE OF CORRECTION

PATENT NO. : 8,195,764 B2  
APPLICATION NO. : 11/822955  
DATED : June 5, 2012  
INVENTOR(S) : Yuji Kiyohara et al.

Page 1 of 1

It is certified that error appears in the above-identified patent and that said Letters Patent is hereby corrected as shown below:

Title page, item (73) should read:

(73) Assignee: Brother Kogyo Kabushiki Kaisha, Nagoya (JP)  
XING INC., Nagoya (JP)

Signed and Sealed this  
Nineteenth Day of February, 2013

Teresa Stanek Rea  
*Acting Director of the United States Patent and Trademark Office*